United States Patent
Taitz et al.

(10) Patent No.: US 12,556,499 B2
(45) Date of Patent: Feb. 17, 2026

(54) EVENT PLANNING IN A CONTENT SHARING PLATFORM

(71) Applicant: Snap Inc., Santa Monica, CA (US)

(72) Inventors: David Taitz, Santa Monica, CA (US); Celia Nicole Mourkogiannis, Los Angeles, CA (US); David Zak Lipowicz, New York, NY (US); Nathaniel Parrott, Brooklyn, NY (US); Nayana Samaranayake, New York, NY (US); Ty Giacalone, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/954,079

(22) Filed: Nov. 20, 2024

(65) Prior Publication Data

US 2025/0088472 A1    Mar. 13, 2025

Related U.S. Application Data

(63) Continuation of application No. 18/590,706, filed on Feb. 28, 2024, now Pat. No. 12,278,791, which is a
(Continued)

(51) Int. Cl.
*H04L 51/04*    (2022.01)
*G06F 3/14*    (2006.01)
(Continued)

(52) U.S. Cl.
CPC ............ *H04L 51/04* (2013.01); *G06F 3/1454* (2013.01); *G06T 11/60* (2013.01); *H04L 51/10* (2013.01);
(Continued)

(58) Field of Classification Search
CPC ...... H04L 51/04; H04L 51/52; H04L 65/4015; G06F 3/1454; G06T 11/60; G06T 2200/24
(Continued)

(56) References Cited

U.S. PATENT DOCUMENTS

| 666,223 A | 1/1901 | Shedlock |
|---|---|---|
| 4,581,634 A | 4/1986 | Williams |

(Continued)

FOREIGN PATENT DOCUMENTS

| CA | 2887596 A1 | 7/2015 |
|---|---|---|
| CN | 1653829 A | 8/2005 |

(Continued)

OTHER PUBLICATIONS

"U.S. Appl. No. 18/590,706, Corrected Notice of Allowability mailed Feb. 12, 2025", 2 pgs.
(Continued)

*Primary Examiner* — Anthony Mejia
(74) *Attorney, Agent, or Firm* — Schwegman Lundberg & Woessner, P.A.

(57) ABSTRACT

Systems and methods are provided for receiving a selection to add an event invite media overlay to a media content item, receiving content to be added to the event invite media overlay, the content corresponding to an event, and adding to the event invite media overlay, the content corresponding to the event to generate a custom event invite media overlay. The systems and methods further comprise causing display of the custom event invite media overlay on the media content item, receiving at least one user to which to send an invite to the event, and sending, to a second computing device associated with the at least one user, an invite to the event, the invite comprising the custom event invite media overlay and the media content item.

20 Claims, 23 Drawing Sheets

Related U.S. Application Data continuation of application No. 18/205,246, filed on Jun. 2, 2023, now Pat. No. 11,973,728, which is a continuation of application No. 17/843,858, filed on Jun. 17, 2022, now Pat. No. 11,722,442, which is a continuation of application No. 17/222,247, filed on Apr. 5, 2021, now Pat. No. 11,418,465, which is a continuation of application No. 16/503,783, filed on Jul. 5, 2019, now Pat. No. 11,134,036.

(51) Int. Cl.
*G06T 11/60* (2006.01)
*H04L 51/10* (2022.01)
*H04L 51/52* (2022.01)
*H04L 65/401* (2022.01)

(52) U.S. Cl.
CPC .......... *H04L 51/52* (2022.05); *H04L 65/4015* (2013.01); *G06T 2200/24* (2013.01)

(58) Field of Classification Search
USPC ........................................................ 709/206
See application file for complete search history.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanback et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,681,393 B1 * | 1/2004 | Bauminger ...... H04N 21/44222 348/E7.071 |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,732,103 B1 | 5/2004 | Strick et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,397,806 B2 | 7/2008 | Burger |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,818,415 B2 * | 10/2010 | Jhanji ..................... H04L 67/54 709/207 |
| 7,856,360 B2 | 12/2010 | Kramer et al. |
| 7,912,896 B2 | 3/2011 | Wolovitz et al. |
| 8,001,204 B2 | 8/2011 | Burtner et al. |
| 8,032,586 B2 | 10/2011 | Challenger et al. |
| 8,065,171 B2 | 11/2011 | Nguyen et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |

(56) References Cited

U.S. PATENT DOCUMENTS

| | | |
|---|---|---|
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,643,677 B2 | 2/2014 | Suzuki |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| RE45,040 E | 7/2014 | Fish et al. |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,843,835 B1 | 9/2014 | Busey et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,967 B2 * | 1/2015 | Huston .................. H04W 4/21 345/635 |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,118,723 B1 * | 8/2015 | Su .......................... G06F 15/00 |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,245,025 B2 | 1/2016 | Chen |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,344,606 B2 | 5/2016 | Hartley et al. |
| 9,356,904 B1 | 5/2016 | Ho |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,495,086 B2 | 11/2016 | May et al. |
| 9,503,873 B1 | 11/2016 | Yadav |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,628,950 B1 | 4/2017 | Noeth et al. |
| 9,639,561 B2 * | 5/2017 | Roberts .................. G06F 16/21 |
| 9,652,896 B1 | 5/2017 | Jurgenson et al. |
| 9,659,244 B2 | 5/2017 | Anderton et al. |
| 9,681,099 B1 | 6/2017 | Deets, Jr. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,817,995 B2 | 11/2017 | Papakipos et al. |
| 9,825,898 B2 | 11/2017 | Sehn |
| 9,854,219 B2 | 12/2017 | Sehn |
| 9,918,193 B1 * | 3/2018 | Nguyen ................ H04W 4/023 |
| 9,961,520 B2 | 5/2018 | Brooks et al. |
| 9,977,510 B1 | 5/2018 | Moffett et al. |
| 9,992,146 B2 | 6/2018 | Fabre et al. |
| 10,037,498 B2 * | 7/2018 | Correll ............... G06Q 10/0635 |
| 10,049,330 B2 | 8/2018 | Alag et al. |
| 10,395,257 B2 | 8/2019 | Patterson et al. |
| 10,471,341 B1 | 11/2019 | Xu |
| 10,559,107 B1 | 2/2020 | Charlton et al. |
| 10,674,311 B1 | 6/2020 | Bouba et al. |
| 10,686,748 B1 | 6/2020 | Dorsey et al. |
| 10,728,701 B1 | 7/2020 | Chandrasekaran et al. |
| 10,791,077 B2 | 9/2020 | Andreou et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,052,322 B1 * | 7/2021 | Wu ....................... G06F 3/0481 |
| 11,134,036 B2 | 9/2021 | Taitz et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,411,900 B2 | 8/2022 | Boyd et al. |
| 11,418,465 B2 | 8/2022 | Taitz et al. |
| 11,601,613 B1 * | 3/2023 | Clark .................... H04N 7/152 |

(56) References Cited

U.S. PATENT DOCUMENTS

| | | |
|---|---|---|
| 11,700,225 B2 | 7/2023 | Boyd et al. |
| 11,722,442 B2 | 8/2023 | Taitz et al. |
| 11,727,430 B2 | 8/2023 | Mitchell |
| 11,838,252 B2 | 12/2023 | Andreou et al. |
| 11,921,993 B2 | 3/2024 | Tyler et al. |
| 11,973,728 B2 | 4/2024 | Taitz et al. |
| 11,978,127 B2 | 5/2024 | Elias et al. |
| 12,126,588 B2 | 10/2024 | Boyd et al. |
| 12,244,549 B2 | 3/2025 | Boyd et al. |
| 12,278,791 B2 | 4/2025 | Taitz et al. |
| 2002/0047868 A1 | 4/2002 | Miyazawa |
| 2002/0070954 A1 | 6/2002 | Lang |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0156848 A1* | 10/2002 | Grouse .................. G06Q 10/10 709/204 |
| 2003/0001846 A1 | 1/2003 | Davis et al. |
| 2003/0012150 A1 | 1/2003 | Chapuran et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0162881 A1 | 8/2004 | Digate et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0267975 A1 | 12/2005 | Qureshi et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198316 A1 | 8/2007 | Boland et al. |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0242131 A1 | 10/2007 | Sanz-pastor et al. |
| 2007/0243887 A1 | 10/2007 | Bandhole et al. |
| 2007/0244750 A1 | 10/2007 | Grannan et al. |
| 2007/0250366 A1 | 10/2007 | Nurmi |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076453 A1 | 3/2008 | Cai et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0098079 A1 | 4/2008 | Sanghavi |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0162615 A1 | 7/2008 | Hurmola et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |

(56) References Cited

U.S. PATENT DOCUMENTS

| | | |
|---|---|---|
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199230 A1 | 8/2009 | Kumar et al. |
| 2009/0199242 A1 | 8/2009 | Johnson et al. |
| 2009/0215469 A1 | 8/2009 | Fisher et al. |
| 2009/0228322 A1 | 9/2009 | Van Os et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0290690 A1 | 11/2009 | Fan et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0069104 A1 | 3/2010 | Neil et al. |
| 2010/0082427 A1 | 4/2010 | Burgener et al. |
| 2010/0082513 A1* | 4/2010 | Liu .................... H04L 63/1458 706/46 |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131598 A1 | 5/2010 | Ruelas-Arana |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2010/0325220 A1 | 12/2010 | Skinner et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0035678 A1 | 2/2011 | Hamrick et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066363 A1 | 3/2011 | Kimishima |
| 2011/0066743 A1 | 3/2011 | Hurley et al. |
| 2011/0083101 A1 | 4/2011 | Sharon et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0126253 A1* | 5/2011 | Roberts ............... G06F 16/7867 725/114 |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0244894 A1 | 10/2011 | Mahalingam |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0312307 A1 | 12/2011 | Gross et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0102123 A1 | 4/2012 | Tysk |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246679 A1 | 9/2012 | Chen |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290666 A1 | 11/2012 | Fabre et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |

(56) References Cited

U.S. PATENT DOCUMENTS

| | | |
|---|---|---|
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2012/0331568 A1* | 12/2012 | Weinstein ............ H04L 12/185 726/29 |
| 2013/0006759 A1 | 1/2013 | Srivastava et al. |
| 2013/0024757 A1 | 1/2013 | Doll et al. |
| 2013/0035995 A1 | 2/2013 | Patterson et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0066963 A1* | 3/2013 | Odio .................. H04L 51/52 709/204 |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0088494 A1 | 4/2013 | Ortiz |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0144674 A1* | 6/2013 | Kim ................. G06Q 30/0267 705/7.19 |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0166385 A1 | 6/2013 | Russell |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198013 A1* | 8/2013 | Shehan ................. G06Q 30/02 705/14.73 |
| 2013/0198176 A1 | 8/2013 | Kim |
| 2013/0212494 A1* | 8/2013 | Heiferman .......... H04L 12/1818 715/753 |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0329060 A1* | 12/2013 | Yim ..................... G06F 16/538 348/207.1 |
| 2013/0332856 A1* | 12/2013 | Sanders ............... G06F 3/0488 715/753 |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0143434 A1 | 5/2014 | Sanche |
| 2014/0149519 A1 | 5/2014 | Redfern et al. |
| 2014/0155102 A1 | 6/2014 | Cooper et al. |
| 2014/0172856 A1 | 6/2014 | Imbruce et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0244640 A1 | 8/2014 | Mccoy et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0280566 A1* | 9/2014 | Chen .................... H04L 51/52 709/204 |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0379798 A1* | 12/2014 | Bunner ................. G06Q 50/01 709/204 |
| 2015/0020086 A1 | 1/2015 | Chen et al. |
| 2015/0046278 A1 | 2/2015 | Pei et al. |
| 2015/0066614 A1 | 3/2015 | Gilmartin et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0170045 A1* | 6/2015 | Kirkham ............... G06Q 10/06 706/11 |
| 2015/0172534 A1 | 6/2015 | Miyakawa et al. |
| 2015/0178260 A1 | 6/2015 | Brunson |
| 2015/0180980 A1 | 6/2015 | Welinder et al. |
| 2015/0199082 A1 | 7/2015 | Scholler et al. |
| 2015/0222580 A1* | 8/2015 | Grue .................... H04L 65/4015 709/206 |
| 2015/0222814 A1 | 8/2015 | Li et al. |
| 2015/0227602 A1 | 8/2015 | Ramu et al. |
| 2015/0261917 A1 | 9/2015 | Smith |
| 2015/0269531 A1 | 9/2015 | Menayas et al. |
| 2015/0271126 A1 | 9/2015 | Menayas et al. |
| 2015/0271638 A1 | 9/2015 | Menayas et al. |
| 2015/0312184 A1 | 10/2015 | Langholz et al. |
| 2015/0324826 A1* | 11/2015 | Mizushima ........ G06Q 30/0214 705/14.16 |
| 2015/0350136 A1 | 12/2015 | Flynn, III et al. |

(56) References Cited

U.S. PATENT DOCUMENTS

| | | |
|---|---|---|
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014059 A1 | 1/2016 | Rathod |
| 2016/0014063 A1 | 1/2016 | Hogeg et al. |
| 2016/0034827 A1 | 2/2016 | Morris |
| 2016/0049008 A1 | 2/2016 | Haddick et al. |
| 2016/0057156 A1 | 2/2016 | Lin et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0094961 A1 | 3/2016 | Agrawal et al. |
| 2016/0099901 A1 | 4/2016 | Allen et al. |
| 2016/0148158 A1* | 5/2016 | Marth ............... G06Q 30/0243 |
| | | 705/14.72 |
| 2016/0180887 A1 | 6/2016 | Sehn |
| 2016/0182422 A1 | 6/2016 | Sehn et al. |
| 2016/0182875 A1 | 6/2016 | Sehn |
| 2016/0191653 A1* | 6/2016 | Aluotto ............... H04L 51/234 |
| | | 709/205 |
| 2016/0196239 A1 | 7/2016 | Liu et al. |
| 2016/0196584 A1 | 7/2016 | Franklin et al. |
| 2016/0239248 A1 | 8/2016 | Sehn |
| 2016/0253833 A1* | 9/2016 | Lew ................... H04N 1/00196 |
| | | 715/202 |
| 2016/0261527 A1 | 9/2016 | Huang |
| 2016/0269675 A1* | 9/2016 | Tsujimoto ............ H04N 9/8233 |
| 2016/0277419 A1 | 9/2016 | Allen et al. |
| 2016/0302037 A1 | 10/2016 | Jack et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0006094 A1 | 1/2017 | Abou Mahmoud et al. |
| 2017/0024091 A1* | 1/2017 | Hosier, Jr. ............ G06F 3/04883 |
| 2017/0061308 A1 | 3/2017 | Chen et al. |
| 2017/0104712 A1 | 4/2017 | Cho et al. |
| 2017/0118034 A1 | 4/2017 | Soli |
| 2017/0124606 A1 | 5/2017 | Belle |
| 2017/0149699 A1* | 5/2017 | Hinson, Jr. ............. H04L 51/10 |
| 2017/0161382 A1 | 6/2017 | Ouimet et al. |
| 2017/0161599 A1 | 6/2017 | Li et al. |
| 2017/0177607 A1* | 6/2017 | Fahey ................. G06F 21/6218 |
| 2017/0221095 A1* | 8/2017 | Gauglitz ............... G06Q 50/01 |
| 2017/0263029 A1 | 9/2017 | Yan et al. |
| 2017/0279751 A1* | 9/2017 | Quirarte ................ H04L 51/08 |
| 2017/0286994 A1 | 10/2017 | Truong |
| 2017/0287006 A1 | 10/2017 | Azmoodeh et al. |
| 2017/0295250 A1 | 10/2017 | Samaranayake et al. |
| 2017/0301043 A1 | 10/2017 | Soli |
| 2017/0351977 A1 | 12/2017 | Bijor |
| 2017/0357950 A1 | 12/2017 | Bennett et al. |
| 2017/0374003 A1 | 12/2017 | Allen et al. |
| 2017/0374508 A1 | 12/2017 | Davis et al. |
| 2018/0013861 A1* | 1/2018 | Howard ................. H04L 67/75 |
| 2018/0054487 A1 | 2/2018 | Hebsur et al. |
| 2018/0077542 A1 | 3/2018 | Xie et al. |
| 2018/0113587 A1 | 4/2018 | Allen et al. |
| 2018/0130138 A1 | 5/2018 | Kumar |
| 2018/0191831 A1* | 7/2018 | Wadley ................. H04L 67/131 |
| 2018/0227376 A1 | 8/2018 | Schneider et al. |
| 2018/0241705 A1 | 8/2018 | Sarafa et al. |
| 2018/0246623 A1 | 8/2018 | Peled et al. |
| 2018/0246983 A1 | 8/2018 | Rathod |
| 2018/0253901 A1 | 9/2018 | Charlton et al. |
| 2018/0329622 A1 | 11/2018 | Missig et al. |
| 2018/0332446 A1 | 11/2018 | Seidman |
| 2018/0336644 A1 | 11/2018 | Albertine et al. |
| 2018/0350144 A1 | 12/2018 | Rathod |
| 2018/0351888 A1 | 12/2018 | Howard |
| 2018/0351895 A1* | 12/2018 | Rathod ................... A63F 13/31 |
| 2018/0357609 A1 | 12/2018 | Hwacinski et al. |
| 2019/0052587 A1 | 2/2019 | Andreou et al. |
| 2019/0188752 A1 | 6/2019 | Jones |
| 2019/0199907 A1 | 6/2019 | Daulton |
| 2019/0205841 A1 | 7/2019 | Burlin et al. |
| 2019/0287418 A1* | 9/2019 | Rabie ..................... G06Q 10/10 |
| 2019/0325561 A1 | 10/2019 | Anilkumar et al. |
| 2019/0333023 A1 | 10/2019 | Foran |
| 2019/0356620 A1 | 11/2019 | Presley et al. |
| 2019/0392399 A1 | 12/2019 | Horne |
| 2020/0104020 A1 | 4/2020 | Grantham et al. |
| 2020/0112450 A1 | 4/2020 | Chhabra et al. |
| 2020/0117339 A1 | 4/2020 | Amitay et al. |
| 2020/0120170 A1* | 4/2020 | Amitay ............... G06F 16/9535 |
| 2020/0177965 A1* | 6/2020 | Fawcett ............. H04N 21/6334 |
| 2020/0184478 A1 | 6/2020 | Peled et al. |
| 2020/0193390 A1 | 6/2020 | Almanza Ahumada et al. |
| 2020/0314586 A1 | 10/2020 | Bouba et al. |
| 2020/0358728 A1 | 11/2020 | Andreou et al. |
| 2020/0382912 A1 | 12/2020 | Dancie et al. |
| 2020/0401225 A1 | 12/2020 | Jaureguiberry et al. |
| 2020/0410453 A1 | 12/2020 | Nalliah et al. |
| 2021/0006519 A1 | 1/2021 | Taitz et al. |
| 2021/0011612 A1 | 1/2021 | Dancie et al. |
| 2021/0042724 A1 | 2/2021 | Rathod |
| 2021/0152979 A1 | 5/2021 | Berardino et al. |
| 2021/0203522 A1 | 7/2021 | Kim et al. |
| 2021/0218571 A1 | 7/2021 | Ansari et al. |
| 2021/0226904 A1 | 7/2021 | Taitz et al. |
| 2021/0266704 A1 | 8/2021 | Dancie et al. |
| 2021/0286510 A1 | 9/2021 | Tyler et al. |
| 2021/0306288 A1 | 9/2021 | Boyd et al. |
| 2021/0336916 A1 | 10/2021 | Boyd et al. |
| 2021/0377693 A1 | 12/2021 | Bouba et al. |
| 2021/0409904 A1 | 12/2021 | Baylin et al. |
| 2022/0174455 A1 | 6/2022 | Guillaume |
| 2022/0179665 A1 | 6/2022 | Rathod |
| 2022/0269345 A1 | 8/2022 | Jaureguiberry et al. |
| 2022/0321506 A1 | 10/2022 | Taitz et al. |
| 2022/0377031 A1 | 11/2022 | Boyd et al. |
| 2023/0057193 A1 | 2/2023 | Ansari et al. |
| 2023/0318993 A1 | 10/2023 | Taitz et al. |
| 2023/0328014 A1 | 10/2023 | Andreou et al. |
| 2023/0379287 A1 | 11/2023 | Boyd et al. |
| 2023/0396569 A1 | 12/2023 | Boyd et al. |
| 2023/0419566 A1 | 12/2023 | Bliss et al. |
| 2024/0205176 A1 | 6/2024 | Taitz et al. |
| 2025/0023836 A1 | 1/2025 | Boyd et al. |

FOREIGN PATENT DOCUMENTS

| | | |
|---|---|---|
| CN | 1791070 A | 6/2006 |
| CN | 102082740 A | 6/2011 |
| CN | 103457994 A | 12/2013 |
| CN | 103702297 A | 4/2014 |
| CN | 104954402 A | 9/2015 |
| CN | 105378702 A | 3/2016 |
| CN | 106789547 A | 5/2017 |
| CN | 106992921 A | 7/2017 |
| CN | 107545052 A | 1/2018 |
| CN | 111133723 A | 5/2020 |
| CN | 115428414 A | 12/2022 |
| CN | 116567556 A | 8/2023 |
| DE | 202016008173 U1 | 6/2017 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 102236593 B1 | 4/2021 |
| KR | 102343824 B1 | 12/2021 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013008238 A1 | 1/2013 |
| WO | WO-2013008251 A2 | 1/2013 |

(56) References Cited

FOREIGN PATENT DOCUMENTS

| WO | WO-2013045753 A1 | 4/2013 |
|---|---|---|
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017106529 A1 | 6/2017 |
| WO | WO-2017176739 A1 | 10/2017 |
| WO | WO-2017176992 A1 | 10/2017 |
| WO | WO-2018005644 A1 | 1/2018 |
| WO | WO-2019032703 A1 | 2/2019 |
| WO | WO-2021216999 A1 | 10/2021 |
| WO | WO-2023235399 A1 | 12/2023 |

OTHER PUBLICATIONS

"U.S. Appl. No. 18/590,706, Corrected Notice of Allowability mailed Mar. 19, 2025", 2 pgs.
"U.S. Appl. No. 18/590,706, Notice of Allowance mailed Jan. 15, 2025", 6 pgs.
"Chinese Application Serial No. 202180030390.5, Response to Examiner Telephone Interview Filed Oct. 28, 2024", w/ English Claims, 13 pgs.
"Chinese Application Serial No. 202180030390.5, Response to Examiner Telephone Interview Filed Nov. 11, 2024", w/ English Claims, 23 pgs.
"Korean Application Serial No. 10-2022-7041039, Notice of Preliminary Rejection mailed Feb. 3, 2025", w/ English translation, 11 pgs.
"Korean Application Serial No. 10-2022-7041039, Response filed Apr. 3, 2025 to Notice of Preliminary Rejection mailed Feb. 3, 2025", w/ English claims, 31 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 15/859,237, Final Office Action mailed Sep. 6, 2019", 12 pgs.
"U.S. Appl. No. 15/859,237, Non Final Office Action mailed Mar. 28, 2019", 11 pgs.
"U.S. Appl. No. 15/859,237, Notice of Allowability mailed Sep. 2, 2020", 2 pgs.
"U.S. Appl. No. 15/859,237, Notice of Allowance mailed Apr. 22, 2020", 5 pgs.
"U.S. Appl. No. 15/859,237, Response filed Feb. 3, 2020 to Final Office Action mailed Sep. 6, 2019", 9 pgs.
"U.S. Appl. No. 15/859,237, Response filed Aug. 28, 2019 to Non Final Office Action mailed Mar. 28, 2019", 9 pgs.
"U.S. Appl. No. 15/859,237, Supplemental Notice of Allowability mailed May 14, 2020", 2 pgs.
"U.S. Appl. No. 16/503,783, Corrected Notice of Allowability mailed Sep. 2, 2021", 2 pgs.
"U.S. Appl. No. 16/503,783, Non Final Office Action mailed Oct. 16, 2020", 16 pgs.
"U.S. Appl. No. 16/503,783, Notice of Allowance mailed Jan. 11, 2021", 11 pgs.
"U.S. Appl. No. 16/503,783, Notice of Allowance mailed May 27, 2021", 5 pgs.

"U.S. Appl. No. 16/503,783, Response filed Dec. 21, 2020 to Non Final Office Action mailed Oct. 16, 2020", 12 pgs.
"U.S. Appl. No. 16/835,080, 312 Amendment filed May 9, 2022", 8 pgs.
"U.S. Appl. No. 16/835,080, Corrected Notice of Allowability mailed Jul. 6, 2022", 2 pgs.
"U.S. Appl. No. 16/835,080, Examiner Interview Summary mailed Jan. 11, 2022", 3 pgs.
"U.S. Appl. No. 16/835,080, Non Final Office Action mailed Oct. 8, 2021", 12 pgs.
"U.S. Appl. No. 16/835,080, Notice of Allowance mailed Feb. 9, 2022", 9 pgs.
"U.S. Appl. No. 16/835,080, PTO Response to Rule 312 Communication mailed May 16, 2022", 2 pgs.
"U.S. Appl. No. 16/835,080, Response filed Jan. 10, 2022 to Non Final Office Action mailed Oct. 8, 2021", 12 pgs.
"U.S. Appl. No. 16/856,811, Corrected Notice of Allowability mailed Jun. 2, 2023", 3 pgs.
"U.S. Appl. No. 16/856,811, Examiner Interview Summary mailed Jan. 31, 2023", 2 pgs.
"U.S. Appl. No. 16/856,811, Final Office Action mailed Nov. 21, 2022", 25 pgs.
"U.S. Appl. No. 16/856,811, Final Office Action mailed Dec. 27, 2021", 21 pgs.
"U.S. Appl. No. 16/856,811, Non Final Office Action mailed May 11, 2022", 23 pgs.
"U.S. Appl. No. 16/856,811, Non Final Office Action mailed Jun. 9, 2021", 20 pgs.
"U.S. Appl. No. 16/856,811, Notice of Allowance mailed Feb. 22, 2023", 9 pgs.
"U.S. Appl. No. 16/856,811, Response filed Jan. 31, 2023 to Final Office Action mailed Nov. 21, 2022", 11 pgs.
"U.S. Appl. No. 16/856,811, Response filed Apr. 27, 2022 to Final Office Action mailed Dec. 27, 2021", 10 pgs.
"U.S. Appl. No. 16/856,811, Response filed Aug. 11, 2022 to Non Final Office Action mailed May 11, 2022", 10 pgs.
"U.S. Appl. No. 16/856,811, Response filed Sep. 9, 2021 to Non Final Office Action mailed Jun. 9, 2021", 11 pgs.
"U.S. Appl. No. 16/942,061, Corrected Notice of Allowability mailed Sep. 1, 2023", 2 pgs.
"U.S. Appl. No. 16/942,061, Corrected Notice of Allowability mailed Oct. 25, 2023", 2 pgs.
"U.S. Appl. No. 16/942,061, Final Office Action mailed Jan. 5, 2023", 19 pgs.
"U.S. Appl. No. 16/942,061, Non Final Office Action mailed May 26, 2022", 16 pgs.
"U.S. Appl. No. 16/942,061, Notice of Allowability mailed Apr. 12, 2023", 2 pgs.
"U.S. Appl. No. 16/942,061, Notice of Allowance mailed Mar. 30, 2023", 5 pgs.
"U.S. Appl. No. 16/942,061, Preliminary Amendment filed Aug. 31, 2020", 7 pgs.
"U.S. Appl. No. 16/942,061, Response filed Mar. 3, 2023 to Final Office Action mailed Jan. 5, 2023", 10 pgs.
"U.S. Appl. No. 16/942,061, Response filed Sep. 23, 2022 to Non Final Office Action mailed May 26, 2022", 9 pgs.
"U.S. Appl. No. 17/222,247, Corrected Notice of Allowability mailed Jul. 7, 2022", 2 pgs.
"U.S. Appl. No. 17/222,247, Non Final Office Action mailed Jan. 5, 2022", 9 pgs.
"U.S. Appl. No. 17/222,247, Notice of Allowance mailed Apr. 12, 2022", 11 pgs.
"U.S. Appl. No. 17/222,247, Response filed Mar. 22, 2022 to Non Final Office Action mailed Jan. 5, 2022", 7 pgs.
"U.S. Appl. No. 17/818,268, Advisory Action mailed Jan. 25, 2024", 3 pgs.
"U.S. Appl. No. 17/818,268, Final Office Action mailed Nov. 8, 2023", 8 pgs.
"U.S. Appl. No. 17/818,268, Non Final Office Action mailed Mar. 6, 2024", 11 pgs.
"U.S. Appl. No. 17/818,268, Non Final Office Action mailed Jul. 25, 2023", 11 pgs.

(56) References Cited

OTHER PUBLICATIONS

"U.S. Appl. No. 17/818,268, Notice of Allowance mailed Jul. 3, 2024", 7 pgs.
"U.S. Appl. No. 17/818,268, Notice of Allowance mailed Oct. 23, 2024", 6 pgs.
"U.S. Appl. No. 17/818,268, Preliminary Amendment filed Oct. 6, 2022", 8 pgs.
"U.S. Appl. No. 17/818,268, Response filed Jan. 8, 2024 to Final Office Action mailed Nov. 8, 2023", 13 pgs.
"U.S. Appl. No. 17/818,268, Response filed Feb. 7, 2024 to Advisory Action mailed Jan. 25, 2024", 16 pgs.
"U.S. Appl. No. 17/818,268, Response filed Jun. 5, 2024 to Non Final Office Action mailed Mar. 6, 2024", 15 pgs.
"U.S. Appl. No. 17/818,268, Response filed Oct. 24, 2023 to Non Final Office Action mailed Jul. 25, 2023", 12 pgs.
"U.S. Appl. No. 17/843,858, Non Final Office Action mailed Jan. 5, 2023", 8 pgs.
"U.S. Appl. No. 17/843,858, Notice of Allowance mailed Mar. 17, 2023", 11 pgs.
"U.S. Appl. No. 17/843,858, Response filed Feb. 22, 2023 to Non Final Office Action mailed Jan. 5, 2023", 7 pgs.
"U.S. Appl. No. 18/132,267, Non Final Office Action mailed Sep. 14, 2023", 12 pgs.
"U.S. Appl. No. 18/132,267, Notice of Allowance mailed Dec. 27, 2023", 8 pgs.
"U.S. Appl. No. 18/132,267, Response filed Dec. 7, 2023 to Non Final Office Action mailed Sep. 14, 2023", 12 pgs.
"U.S. Appl. No. 18/204,203, Notice of Allowability mailed Dec. 20, 2023", 2 pgs.
"U.S. Appl. No. 18/204,203, Notice of Allowance mailed Nov. 15, 2023", 10 pgs.
"U.S. Appl. No. 18/205,246, Non Final Office Action mailed Oct. 27, 2023", 17 pgs.
"U.S. Appl. No. 18/205,246, Notice of Allowance mailed Dec. 27, 2023", 8 pgs.
"U.S. Appl. No. 18/205,246, Response filed Nov. 3, 2023 to Non Final Office Action mailed Oct. 27, 2023", 8 pgs.
"U.S. Appl. No. 18/321,611, Non Final Office Action mailed Feb. 27, 2024", 7 pgs.
"U.S. Appl. No. 18/321,611, Notice of Allowance mailed Jun. 20, 2024", 7 pgs.
"U.S. Appl. No. 18/321,611, Response filed May 28, 2024 to Non Final Office Action mailed Feb. 27, 2024", 8 pgs.
"U.S. Appl. No. 18/590,706, Notice of Allowance mailed Sep. 26, 2024", 11 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 201880057966.5, Response filed May 7, 2022 to Office Action mailed Feb. 22, 2022", w/ English Claims, 9 pgs.
"Chinese Application Serial No. 201880057966.5, Decision of Rejection mailed Aug. 12, 2022", w/ English Translation, 14 pgs.
"Chinese Application Serial No. 201880057966.5, Office Action mailed Feb. 22, 2022", w/ English translation, 12 pgs.
"Chinese Application Serial No. 201880057966.5, Office Action mailed Jun. 28, 2021", w/ English Translation, 14 pgs.
"Chinese Application Serial No. 201880057966.5, Response filed Nov. 7, 2022 to Decision of Rejection mailed Aug. 12, 2022", w/ English Claims, 12 pgs.
"Chinese Application Serial No. 201880057966.5, Response filed Nov. 12, 2021 to Office Action mailed Jun. 28, 2021", w/ English Claims, 13 pgs.
"Chinese Application Serial No. 202180030390.5, Office Action mailed Feb. 1, 2024", w/ English Translation, 19 pgs.
"Chinese Application Serial No. 202180030390.5, Response filed Jul. 1, 2024 to Office Action mailed Feb. 1, 2024", W/English Claims, 16 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 18842992.2, Communication Pursuant to Article 94(3) EPC mailed Aug. 4, 2021", 10 pgs.
"European Application Serial No. 18842992.2, Communication Pursuant to Article 94(3) EPC mailed Sep. 28, 2023", 13 pgs.
"European Application Serial No. 18842992.2, Extended European Search Report mailed Jul. 20, 2020", 10 pgs.
"European Application Serial No. 21792218.6, Extended European Search Report mailed Apr. 2, 2024", 7 pgs.
"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2018/045815, International Preliminary Report on Patentability mailed Feb. 20, 2020", 9 pgs.
"International Application Serial No. PCT/US2018/045815, International Search Report mailed Nov. 28, 2018", 3 pgs.
"International Application Serial No. PCT/US2018/045815, Written Opinion mailed Nov. 28, 2018", 7 pgs.
"International Application Serial No. PCT/US2021/028840, International Preliminary Report on Patentability mailed Nov. 3, 2022", 6 pgs.
"International Application Serial No. PCT/US2021/028840, International Search Report mailed Aug. 12, 2021", 3 pgs.
"International Application Serial No. PCT/US2021/028840, Written Opinion mailed Aug. 12, 2021", 4 pgs.
"International Application Serial No. PCT/US2023/024011, International Search Report mailed Sep. 25, 2023", 4 pgs.
"International Application Serial No. PCT/US2023/024011, Written Opinion mailed Sep. 25, 2023", 3 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2020-7006769, Notice of Preliminary Rejection mailed Apr. 2, 2021", w/ English Translation, 10 pgs.
"Korean Application Serial No. 10-2020-7006769, Response filed Jul. 8, 2021 to Notice of Preliminary Rejection mailed Apr. 2, 2021", w/ English Claims, 18 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

(56) References Cited

OTHER PUBLICATIONS

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Castelluccia, Claude, et al., "EphPub: Toward robust Ephemeral Publishing", 19th IEEE International Conference on Network Protocols (ICNP), (Oct. 17, 2011), 18 pgs.

Christensson, Per, "Link Definition", TechTerms.com, [Online] Retrieved from the internet: <https://techterms.com/definition/link>, (Jun. 13, 2017), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Fajman, "An Extensible Message Format for Message Disposition Notifications", Request for Comments: 2298, National Institutes of Health, (Mar. 1998), 28 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Sawers, Paul, "Snapchat for IOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.

Shein, Esther, "Ephemeral Data", Communications of the ACM, vol. 56, No. 9, (Sep. 2013), 3 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.

\* cited by examiner

EVENT PLANNING IN A CONTENT SHARING PLATFORM

CLAIM OF PRIORITY

This application is a continuation of U.S. patent application Ser. No. 18/590,706, filed Feb. 28, 2024, which application is a continuation of U.S. patent application Ser. No. 18/205,246, filed Jun. 2, 2023, issued as U.S. Pat. No. 11,973,728 on Apr. 30, 2024, which is a continuation of U.S. patent application Ser. No. 17/843,858, filed Jun. 17, 2022, and issued as U.S. Pat. No. 11,722,442 on Aug. 8, 2023, which is a continuation of U.S. application Ser. No. 17/222,247, filed Apr. 5, 2021, and issued as U.S. Pat. No. 11,418,465 on Aug. 16, 2022, which is a continuation of U.S. application Ser. No. 16/503,783, filed Jul. 5, 2019, and issued as U.S. Pat. No. 11,134,036 on Sep. 28, 2021, which applications are hereby incorporated by reference in their entirety.

BACKGROUND

A content sharing platform may receive millions of messages from users desiring to share media content such as audio, images, and video between user devices (e.g., mobile devices, personal computers). A content sharing platform may further allow users to "chat" with other users by exchanging text messages.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to event planning functionality in a content sharing platform (e.g., a social media platform). As explained above, a content sharing platform may receive millions of messages from users desiring to share media content such as audio, images, and video between user devices (e.g., mobile devices, personal computers, etc.). For example, a user can capture media content, such as an image or video, augment the image or video (e.g., with text, audio, media overlay or other creative tools) and then send a message comprising the augmented image or video to one or more other users. The user can view messages comprising media content from other users and also discover and view media content (e.g., messages and media collections) generated by other users or entities related to a particular interest or topic (e.g., sports, celebrities, food, events). A content sharing platform may further allow users to "chat" with other users by exchanging text messages.

Event planning in such a content sharing platform, however, is difficult to do. For example, a user can send a message to one or more users inviting them to a holiday barbeque or surprise party for a friend, but there is no easy way to surface important details about the event (e.g., date, time, location), notify users about updates to the event, show events on a map, or otherwise provide an easy way to plan and organize an event.

Example embodiments provide functionality in a content sharing platform for event planning. For example, a user can create a custom event invite media overlay that includes content for an event. The custom event invite media overlay can be displayed on a media content item (e.g., an image or video) and sent as an invite to one or more other users. A user receiving the invite can join the event, chat with others that have joined the event, receive notifications about the event (e.g., updates to the event, new users joining the event), forward the invite to other users, and so forth. Events (e.g., actions) corresponding to the event can be logged by a server system (e.g., when a user joins the event, when a user invites another user to the event, when details of the event change). Visual indicators of users attending the event can be displayed on a map on the event location. Moreover, users attending the event can capture media content items that can be automatically added to a media collection for the event group. Accordingly, example embodiments include an infrastructure to allow impromptu hangouts with small groups of friends in an informal fashion (e.g., to grab lunch that day, to go to the movies after work, to grab drinks after work) to more formal invites, such as for birthday parties or other events.

Figure 1:
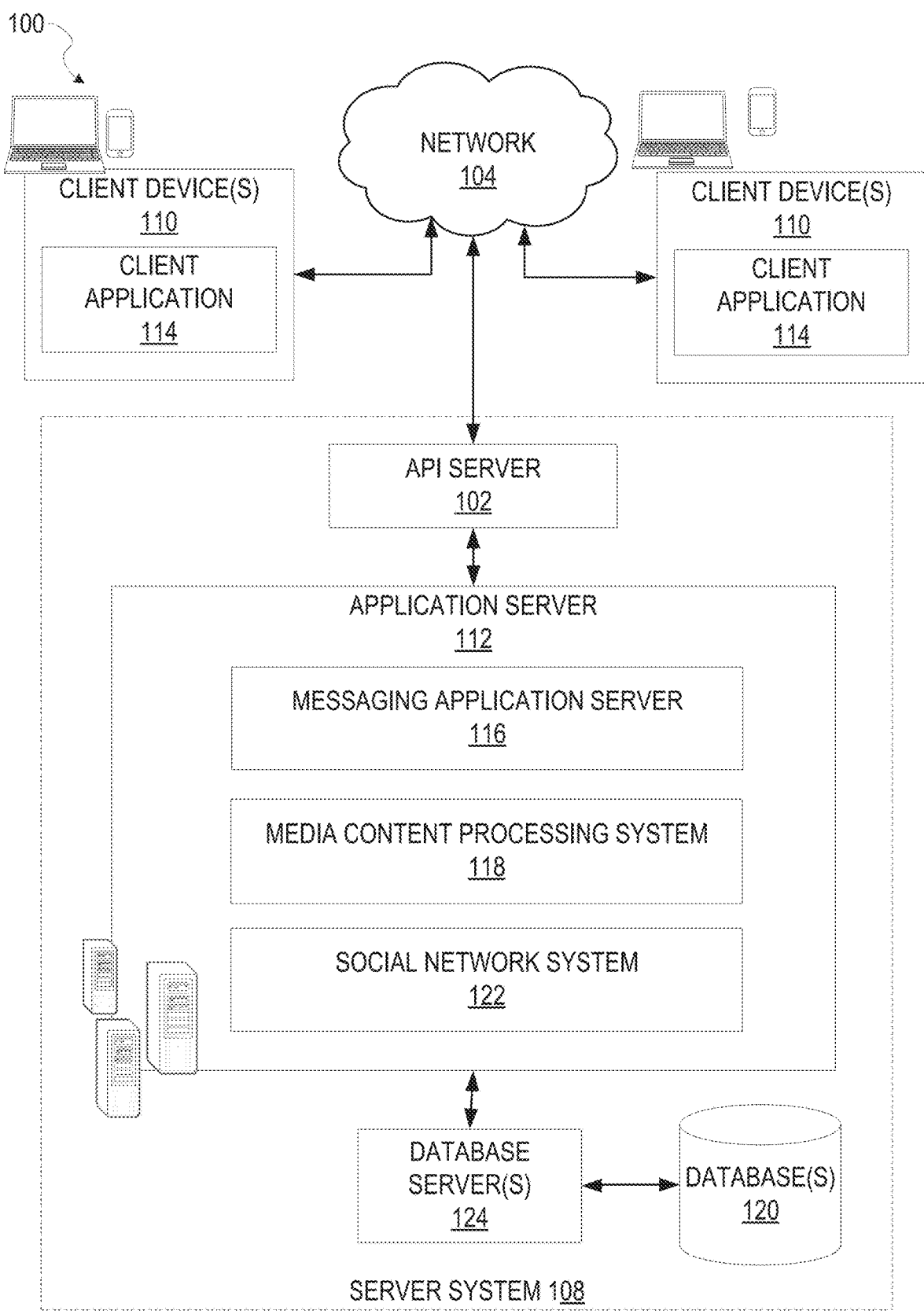
FIG. 1 is a block diagram showing an example networked system for exchanging data (e.g., messages and associated content) over a network, according to some example embodiments.

FIG. 1 is a block diagram illustrating a networked system 100 (e.g., a content sharing platform or messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), audio, and media overlays and to send and receive messages containing such media content items, text, media overlays, and so forth, to and from other users. The client device 110 may be a device of a user that is used to create and edit messages comprising media content, including video, one or more images (e.g., photographs), media overlays or other creative tools, text, and so forth. The client device 110 may further be a device of a user that is used to view and generate interactive messages, view other users on a map, chat (e.g., exchange text messages) with other users of the system, generate and view event invites, join an event, receive notifications related to an event, and so forth.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110, and the input may be communicated to other entities in the system 100 (e.g., third-party servers, the server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, an image or video capture application, an event planning application, and the like.

In some embodiments, one or more client applications 114 may be included in a given one of the client devices 110, and configured to locally provide a user interface and at least some of the functionalities of the application, with the client application 114 configured to communicate with other entities in the system 100 (e.g., third-party servers, the server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, the server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, and a social network system 122, which may be communicatively coupled with each other and with one or more data storages, such as one or more databases 120.

The server system 108 may be a cloud computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., a computing or client device 110), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, event details and tokens, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed either by a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and interactive message usage data, event planning data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); mapping data; the creation and generation of a media overlay, and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
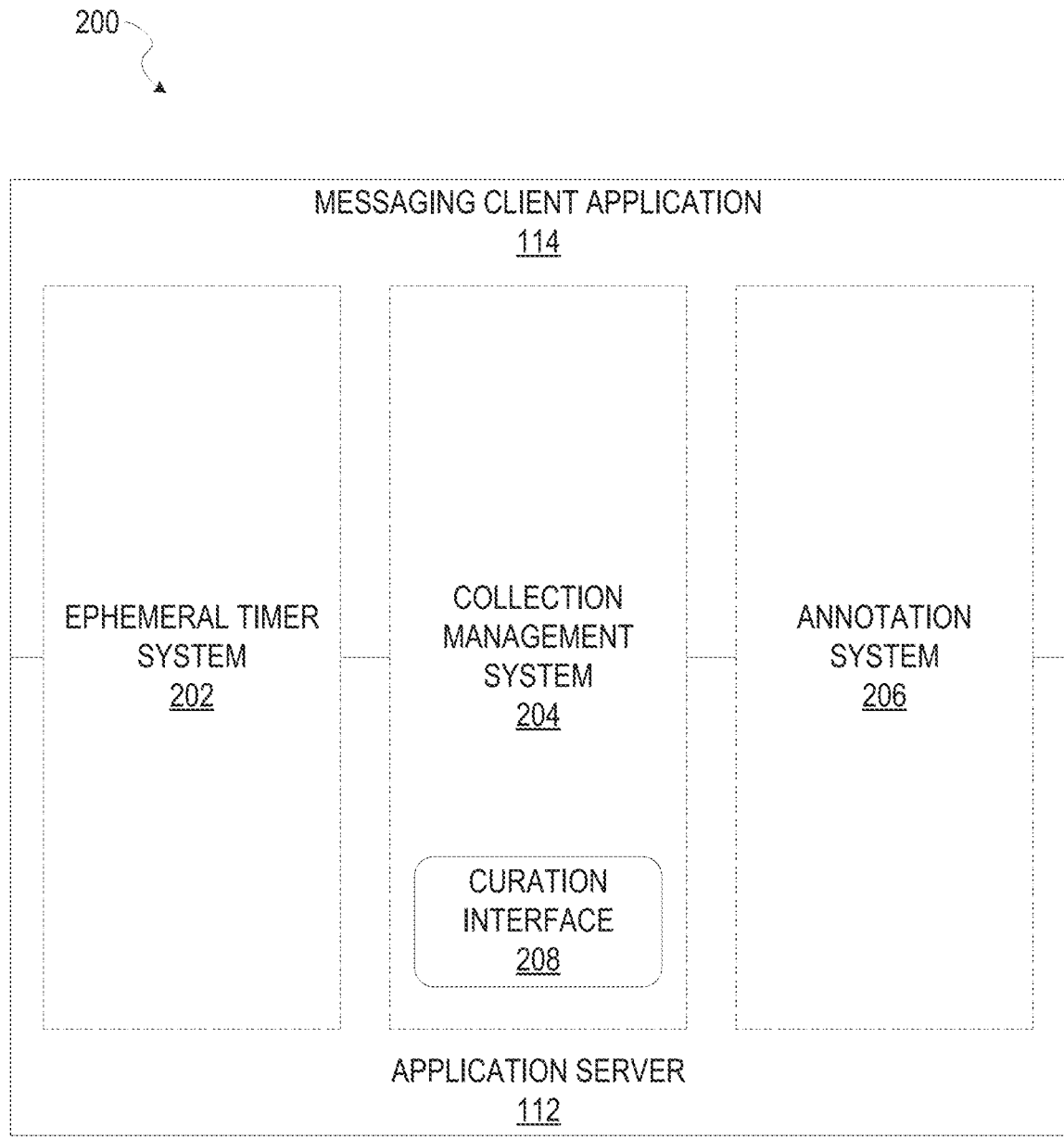
FIG. 2 is a block diagram illustrating further details regarding the messaging system, according to some example embodiments.

FIG. 2 is a block diagram 200 illustrating further details regarding the system 100, according to example embodiments. Specifically, the system 100 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or a collection of messages (e.g., otherwise referred to herein as "media collections," "galleries," "message collections," "stories," and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, a name of a merchant overlay (e.g., Beach Coffee House), or of a home of a user. In another example, the annotation system 206 uses the geolocation of the client device 110 to identify a media overlay that includes the name of a merchant at the geolocation of the client device 110. The media overlay may include other indicia associated with the merchant. The media overlays may be stored in the database(s) 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
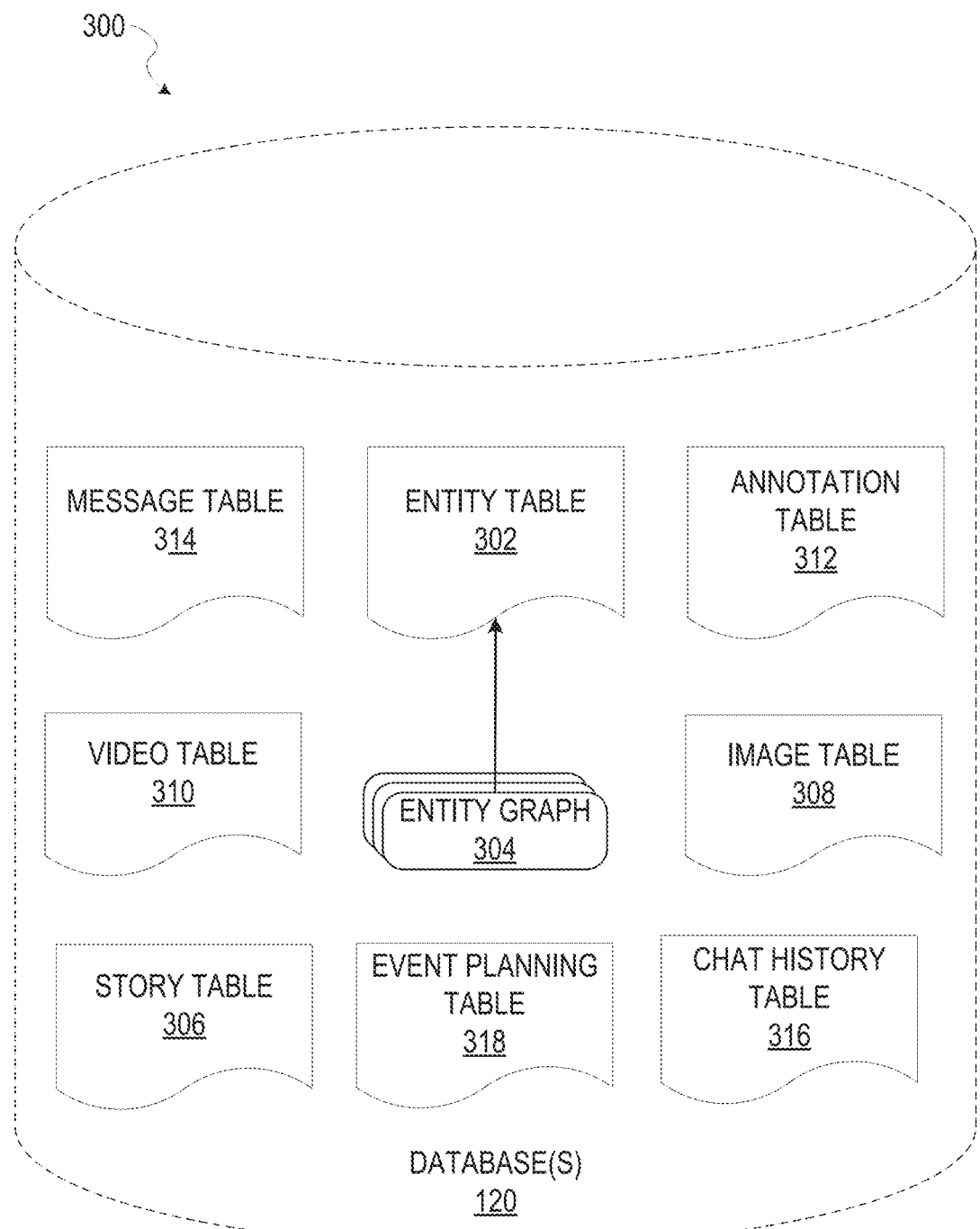
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as "geofilters"), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A chat history table 316 stores data related to text messages exchanged between users in a "chat" session via the messaging application. For example, the chat history table 316 stores all the messages exchanged between users, or all messages for a predefined time period (e.g., last hour, day, week, month, year), so that a user may view a history of text messages the user exchanged between one or more other users.

An event planning table 318 stores data related to an event. For example, the event planning table 318 stores details of an event, logged events (e.g., actions) corresponding to the event (e.g., when a user joins the event, when a user invites another users, when details of the event change), links to chat sessions for the event (e.g., a link to chat sessions in the chat history table 316), tokens for the event, and so forth.

Figure 4:
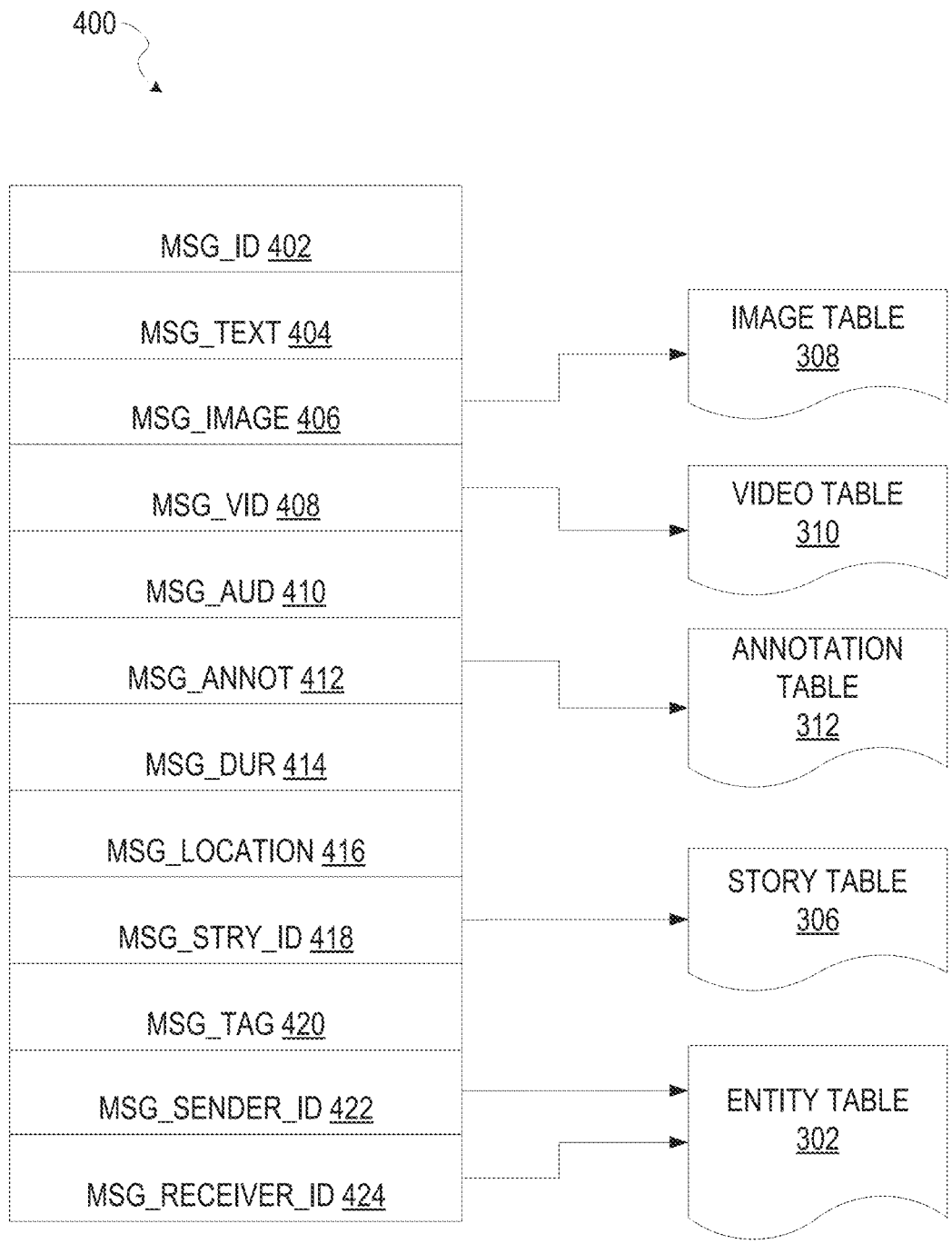
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

An event token (not shown): an identifier (e.g., randomly generated number) indicative of the event.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
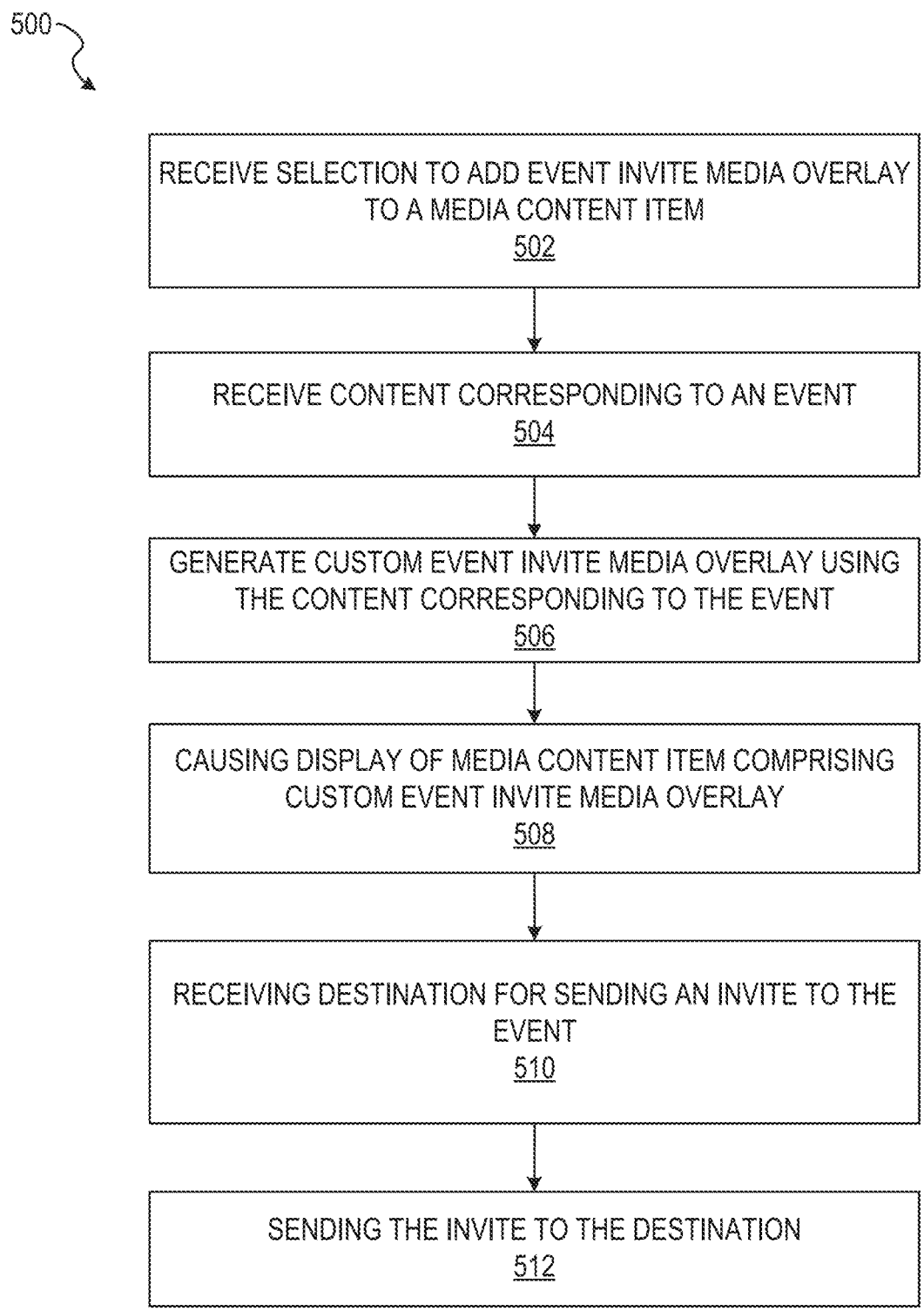
FIG. 5 is a flow chart illustrating aspects of a method, according to some example embodiments.

FIG. 5 is a flow chart illustrating aspects of a method 500, according to some example embodiments. For illustrative purposes, the method 500 is described with respect to the networked system 100 of FIG. 1. It is to be understood that the method 500 may be practiced with other system configurations in other embodiments.

Figure 6:
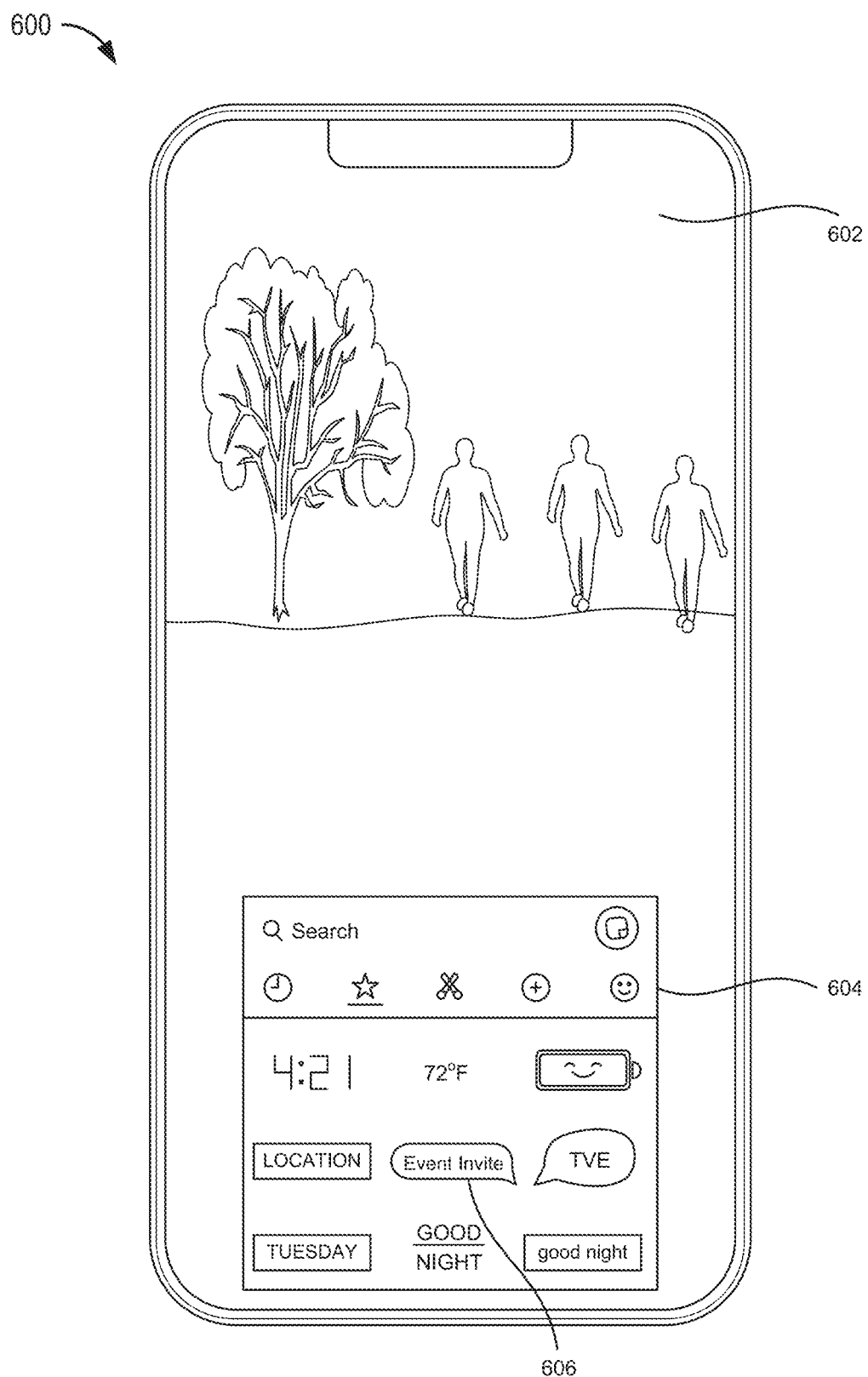
FIGS. 6-21 illustrate example graphical user interfaces (GUIs), according to some example embodiments.

In operation 502, a computing device (e.g., client device 110) receives a selection (e.g., a selection of an option or interface element) to add an event invite media overlay to a media content item. In one example embodiment, a user captures a media content item via a camera device of the computing device. For example, the user captures an image (e.g., photograph) or video. The computing device can display the captured image or video on a display area of the computing device and provide an option (e.g., an interface element) to add a media overlay to the captured media content item. FIG. 6 illustrates an example display 600 on the computing device (e.g., via a graphical user interface (GUI)) showing a media content item 602 captured by a camera device of the computing device and a menu 604 with options to choose a media overlay (e.g., in the form of a sticker). One of the options in the menu 604 is an option for an event invite media overlay 606. The user can choose one or more media overlays from the menu 604 to be added to the media content item 602 (e.g., to augment the media content item by overlaying the media overlay on top of the media content item).

Figure 7:
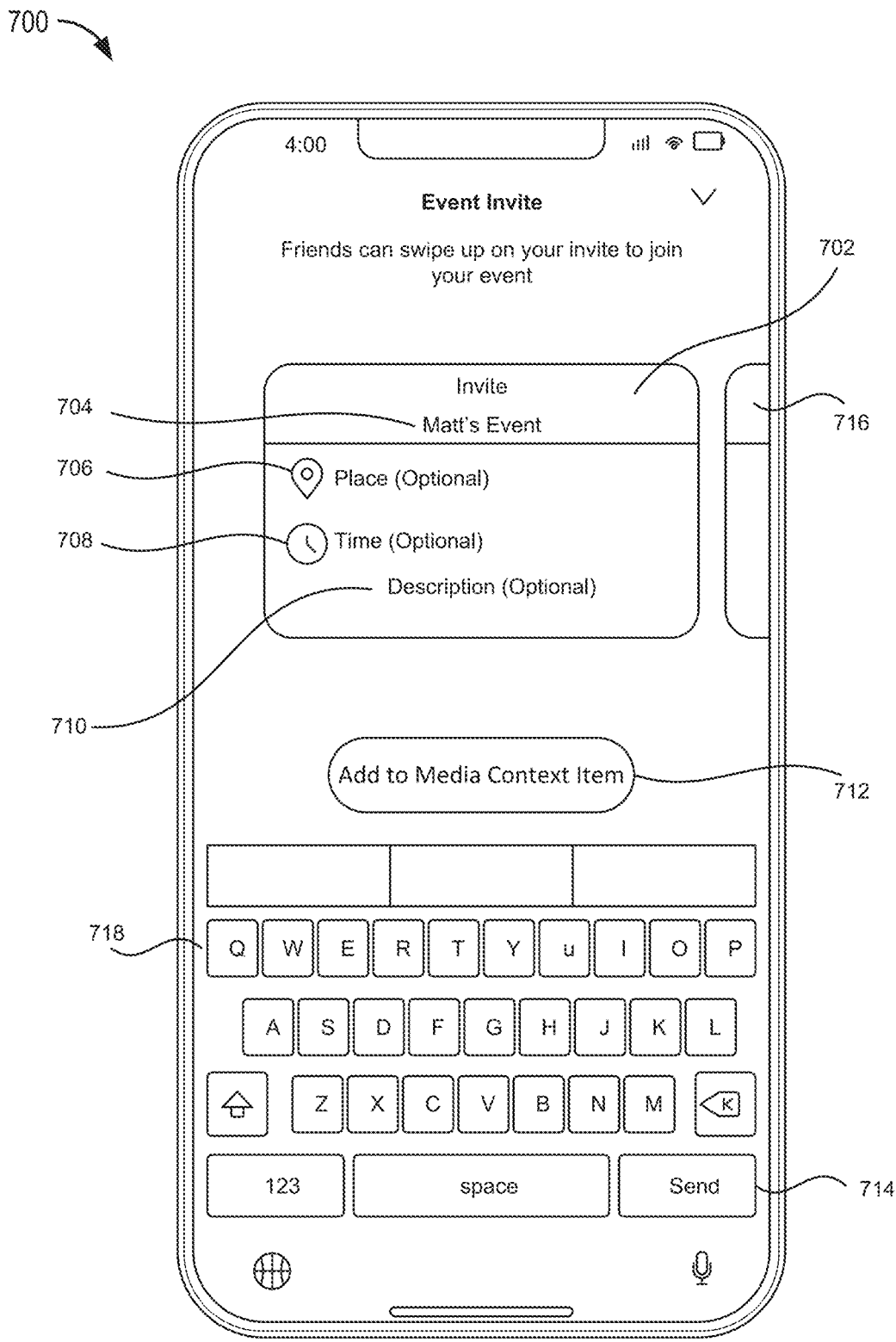

In one example, the user selects the event invite media overlay 606. The computing device receives the selection to add the event invite media overlay to the media content item in operation 502. The computing device causes display of a GUI to enter content (e.g., details) for an event corresponding to the event invite media overlay. FIG. 7 illustrates an example GUI 700 for entering content for an event corresponding to an event invite media overlay 702. For example, a user can enter a title 704 for the event, a location 706 (e.g., address) for the event, a time 708 for the event, and a description 710 for the event. It is noted that everything besides the title are optional, and thus, a user can quickly generate an event with very little information. In one example, the event title can even be optional and the computing device can generate a default tile (e.g., the user's name plus event (e.g., "Nate's Event" or "Sally's Event")) to make it even easier for the user.

In one example, the GUI 700 provides a mechanism to view other event invite media overlays that the user created previously. For example, the user can swipe to the right on the next event invite media overlay 716 to view and edit the event invite media overlay 716.

The user can enter any content for the event invite media overlay 702 via a keyboard 718 or other means. Once the user has completed entering any content in the event invite media overlay 702, the user can add it to the media content item (e.g., via a selection option 712). In one example, instead of adding the event invite media overlay 702 to the media content item, the user can send it directly to one or more users (e.g., via a selection option 714).

Once the user selects to add the event invite media overlay to the media content item, the computing device receives the content to be added to the event invite media overlay, in operation 504, and generates a custom event invite media overlay using the content corresponding to the event in operation 506. For example, the computing device adds the content corresponding to the event (e.g., title, location, date and time) to the event invite media overlay to create a custom event invite media overlay.

Figure 8:
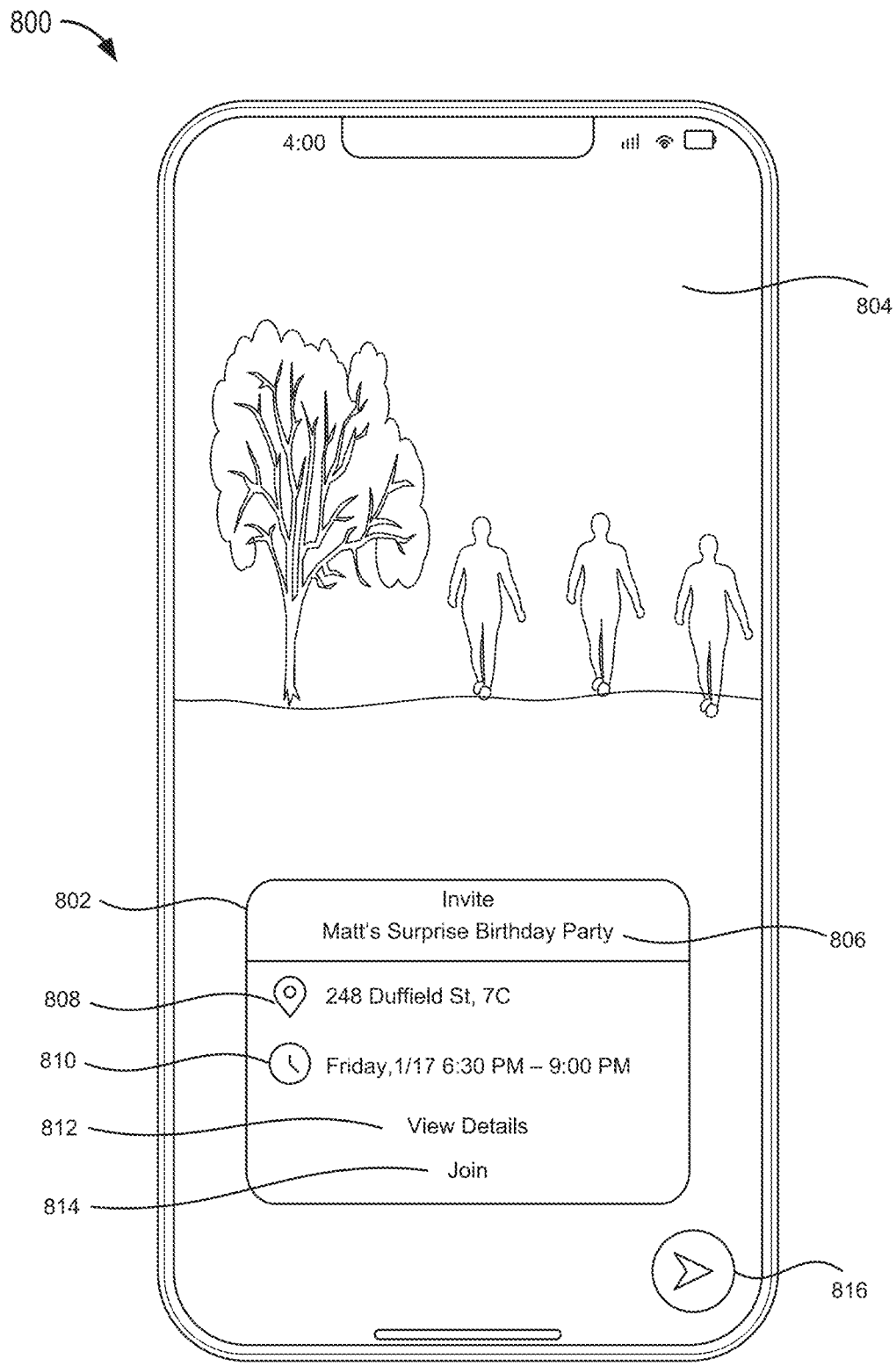

In operation 508, the computing device causes display of the custom event invite media overlay on the media content item. FIG. 8 illustrates an example GUI 800 displaying a custom event invite media overly 802 that is displayed on (e.g., overlaid on) a media content item 804. In this example, the custom event invite media overlay 802 shows an event title 806, an event location 808, an event date and time 810, an option 812 to view details of the event, and an option 814 to join the event. The GUI 800 further includes an option 816 to send the invite to a destination, such as one or more other users.

In one example embodiment, the user can move the event invite media overlay around to different locations on the media content item, rotate the event invite media overlay (e.g., so that it is at a different angle), reshape the event invite media overlay to make it smaller or larger, change the color of the event invite media overlay, change the font, and so forth. In some example embodiments, the event invite media overlay is automatically resized based on the content provided for the event. For example, if only a title is provided (or auto-generated), the event invite media overlay is resized to only show the title. Likewise, if only a title and location are provided, the event invited media overlay is resized to only show the title and location, and so forth, dependent upon the content provided.

Figure 9:
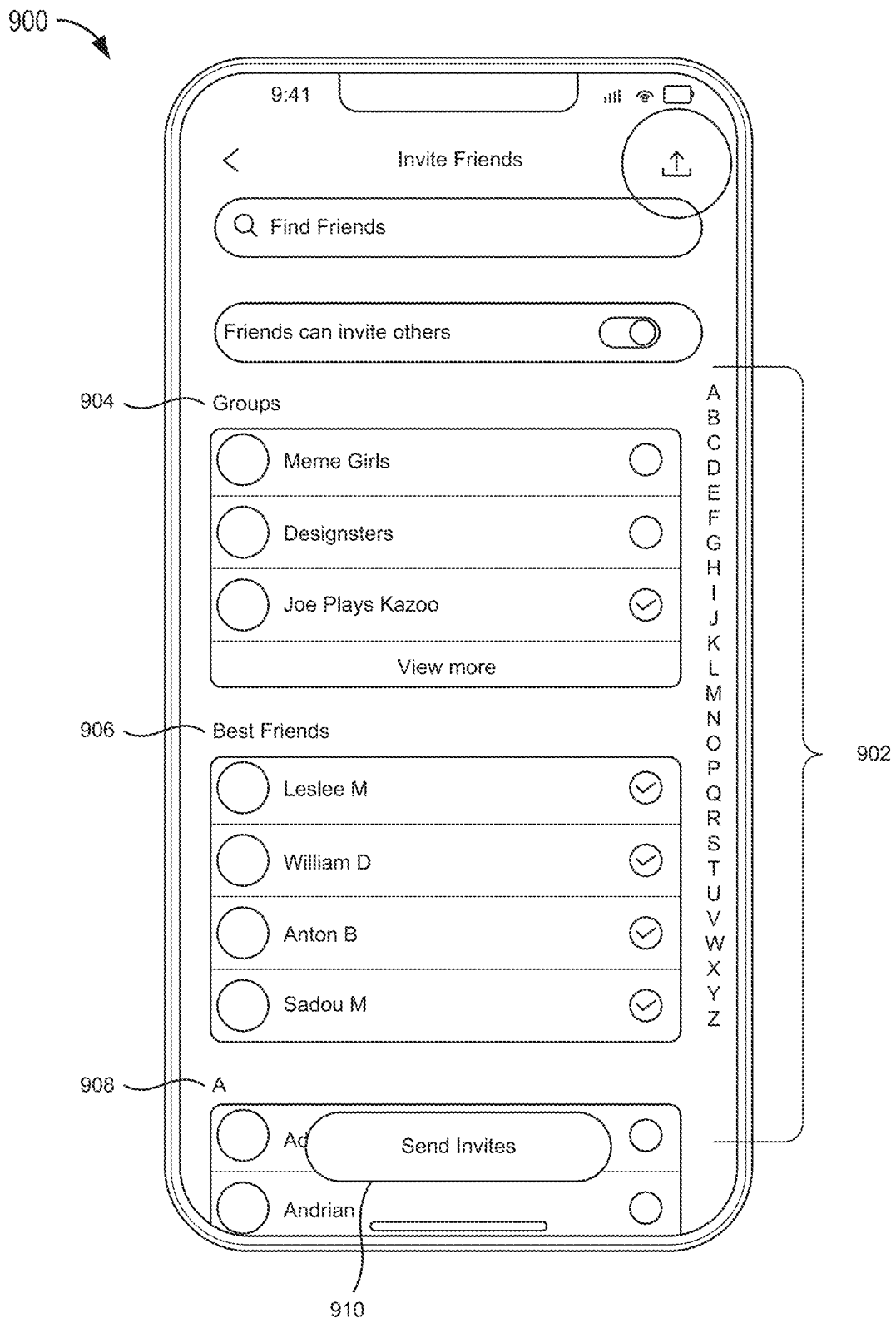

Once the user selects to send the invite to a destination (e.g., via option 816), the computing device can cause a display of a destination list from which the user can select one or more users to which to send the invite. FIG. 9 illustrates an example GUI 900 displaying a destination list 902 comprising groups 904 (e.g., predefined groups of users), best friends 906 (e.g., user-designated close friends), and contacts listed in alphabetical order 908. The user can select one or more groups and/or users to which to send the invite. The GUI 900 also provides an option 910 that the user can select to send the invite once the user has selected one or more groups and/or users to which to send the invite.

In operation 510, the computing device receives at least one destination (e.g., user or group of users) to which to send the invite to the event. In operation 512, the computing device then sends the invite to a second computing device associated with the at least one destination (e.g., a second user). The invite comprises the custom event invite media overlay and the media content item.

In one example, the computing device sends the invite via a computing system (e.g., server system 108) to the second computing device. In one example, the computing device also generates a secure token (e.g., a randomly generated number) that is associated with the invite. The computing device sends the token with the invite to the computing system. The invite comprises the media content item, the event invite media overlay, and any additional metadata associated with the invite. The computing system receives the invite and token and stores the invite and token in one or more datastores (e.g., databases 120). When users join the event, the same token is used to send a request to the computing system to join the event and the token will allow them to join the group. In one example, the computing system generates a new group for the event, the new group comprising the user that set up the event and any users that join the event (e.g., select to join the event via the invite). The users that join the event are added to the group when they elect to join the event.

Figure 10:
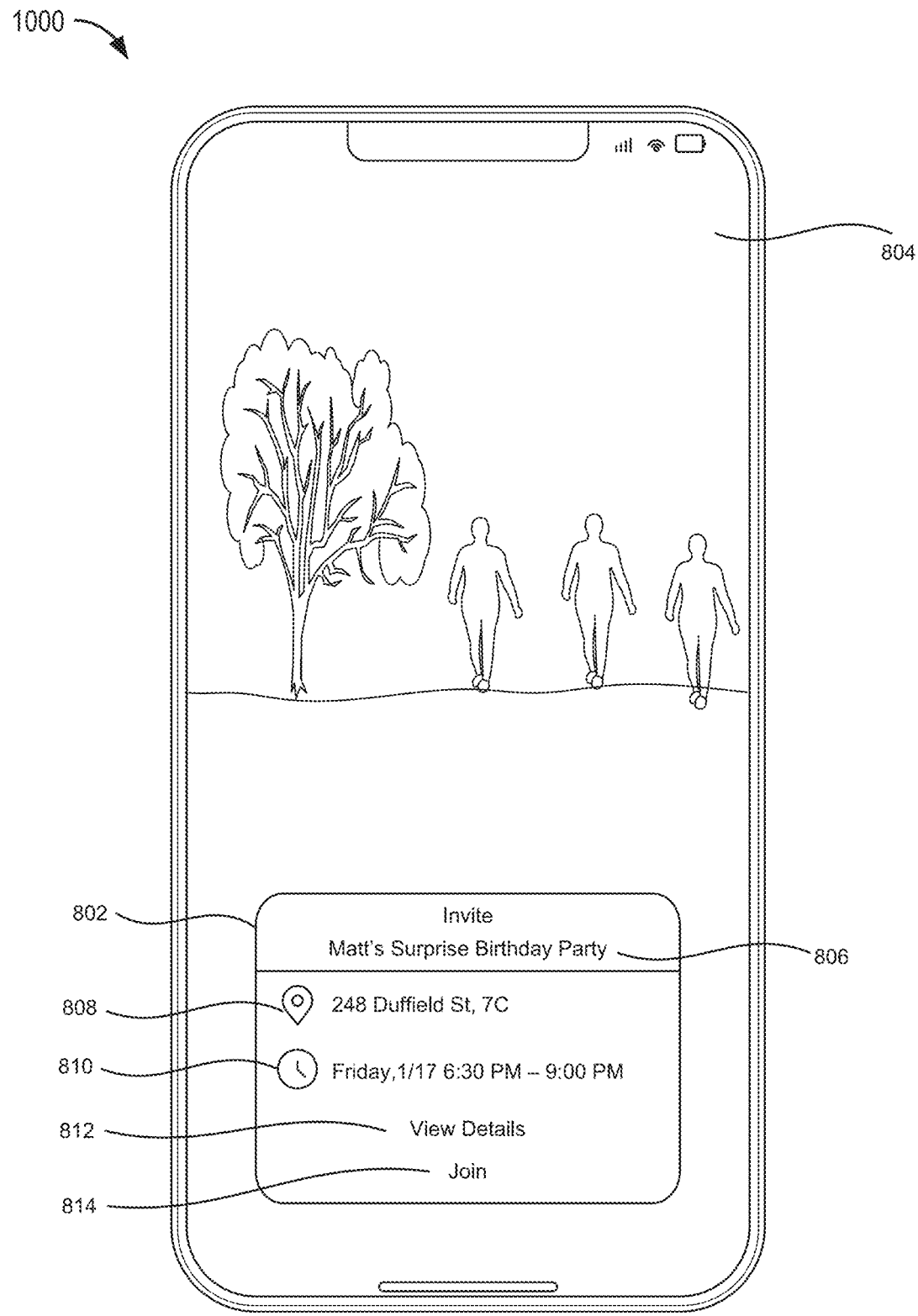

The custom event invite media overlay is displayed on the media content item on a user interface of a computing device associated with a user that has been invited to the event (e.g., the second computing device of the second user). FIG. 10 illustrates an example GUI 1000 displaying the custom event invite media overly 802 that is displayed on (e.g., overlaid on) a media content item 804. In this example, the custom event invite media overlay 802 shows an event title 806, an event location 808, an event date and time 810, an option 812 to view details of the event, and an option 814 to join the event.

Figure 11:
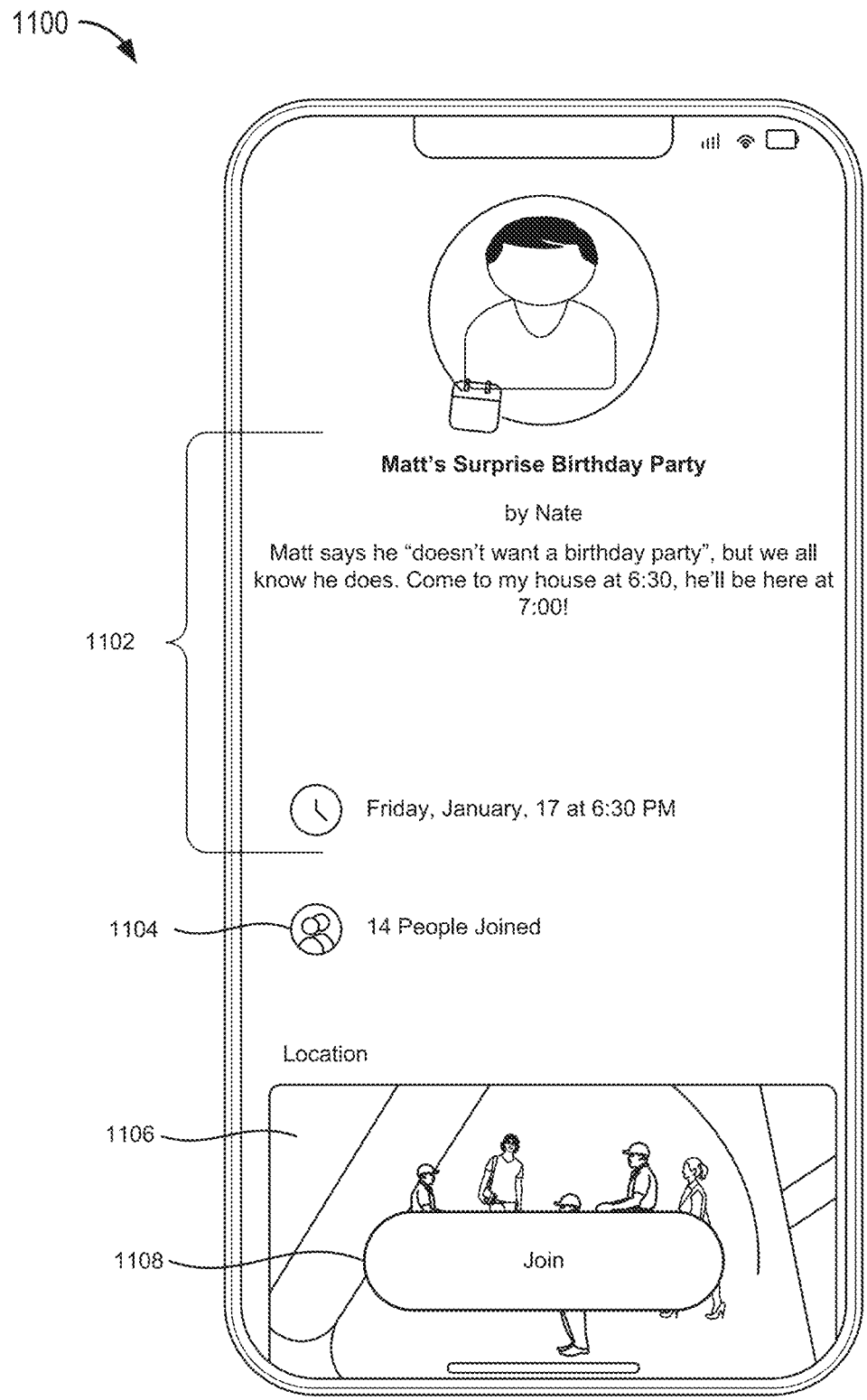

A user can select to view the details of the event (e.g., via option 812) and the computing device associated with the user can display the details of the event or join the event (e.g., via option 814). FIG. 11 illustrates an example GUI 1100 displaying the details of the event 1102, information 1104 on how many other users have joined, a map 1106 showing the location of the event, and an option 1108 to join the event. The map 1106 further shows locations of the users who have joined the event (e.g., showing an avatar representing each user).

Once the user selects to join the event, the computing device sends a request to the computing system (e.g., server system 108) along with the token corresponding to the event. The computing system receives the request and token, determines the corresponding event to the token, and adds the user to the event (e.g., as a member of the group for the event). The computing system logs information related to the user, such as the date and time the user joined the event. In one example, the computing system logs various events related to the event. For example, the computing system logs each time a new user is added (joins) an event and corresponding information, each time a user that has joined the event invites another user to the event and corresponding information, any time an event changes and what changes were made, communications between users via the event group, and so forth.

Figure 12:
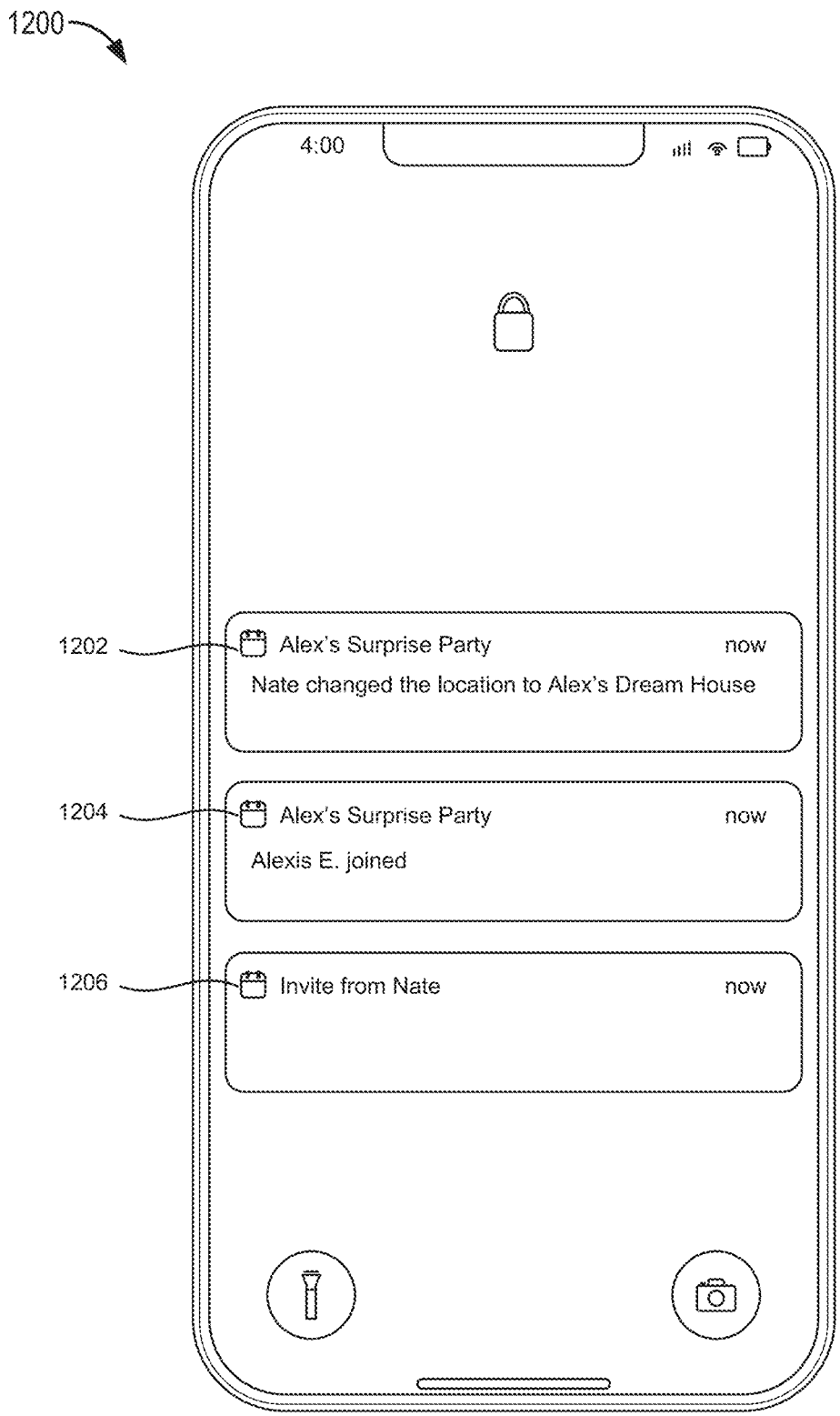

In one example, the computing system generates notifications associated with the event. For example, the computing system generates a notification that the new user joined the event and sends the notification to the computing device corresponding to the user that created the event, to other users who have joined the event, and/or to other users that are invited to the event. The corresponding computing device receives the notification that the new user joined the event and causes display of the notification on a display of the computing device. FIG. 12 illustrates an example display 1200 of a computing device showing three example notifications that have been received by a computing device. The first notification 1202 has information indicating that something in the event has changed (e.g., the location has changed). The second notification 1204 has information indicating that a new user (Alex F.) has joined the event. The third notification 1206 has information indicating that the user has received a new invite.

Figure 13:
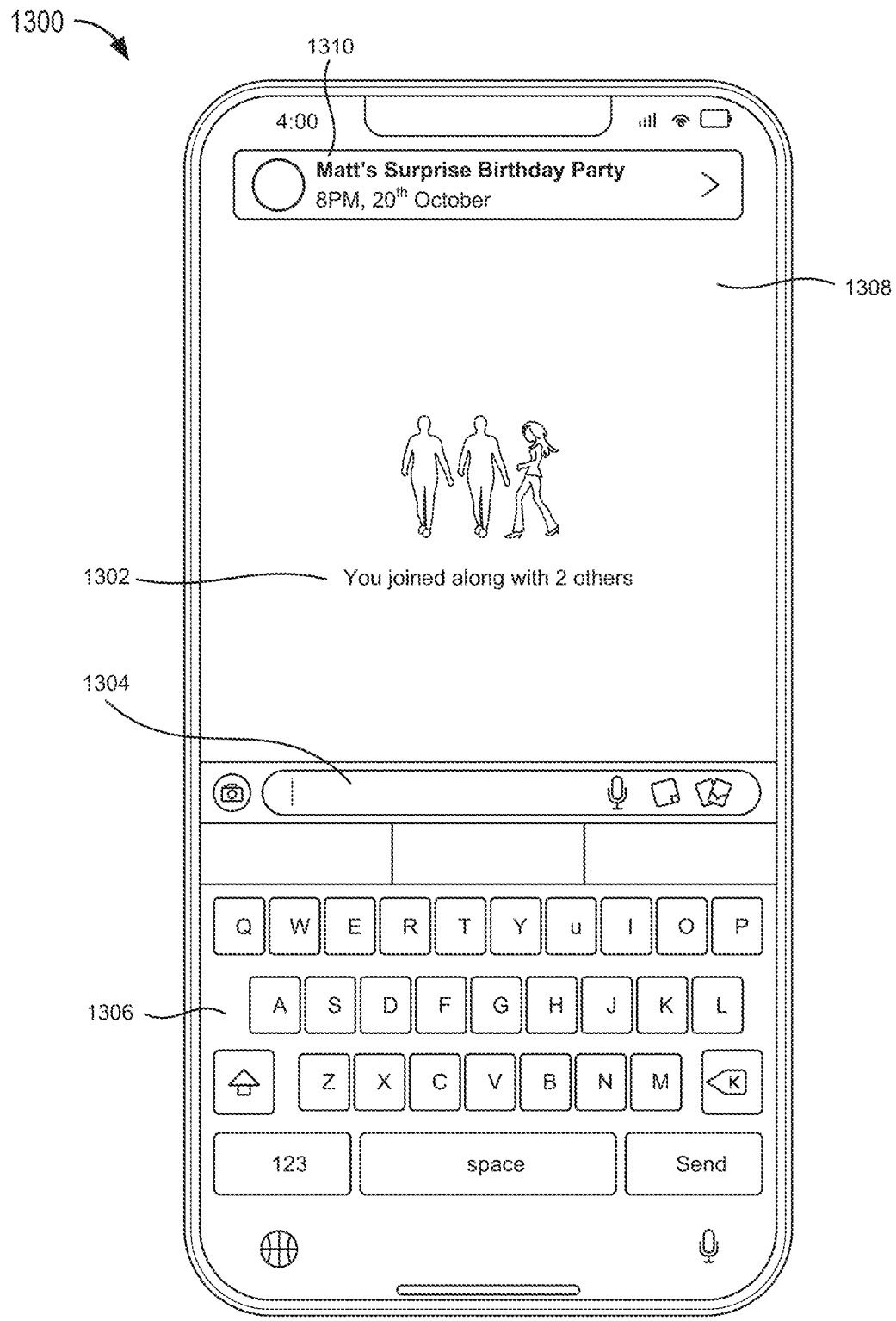
Figure 14:
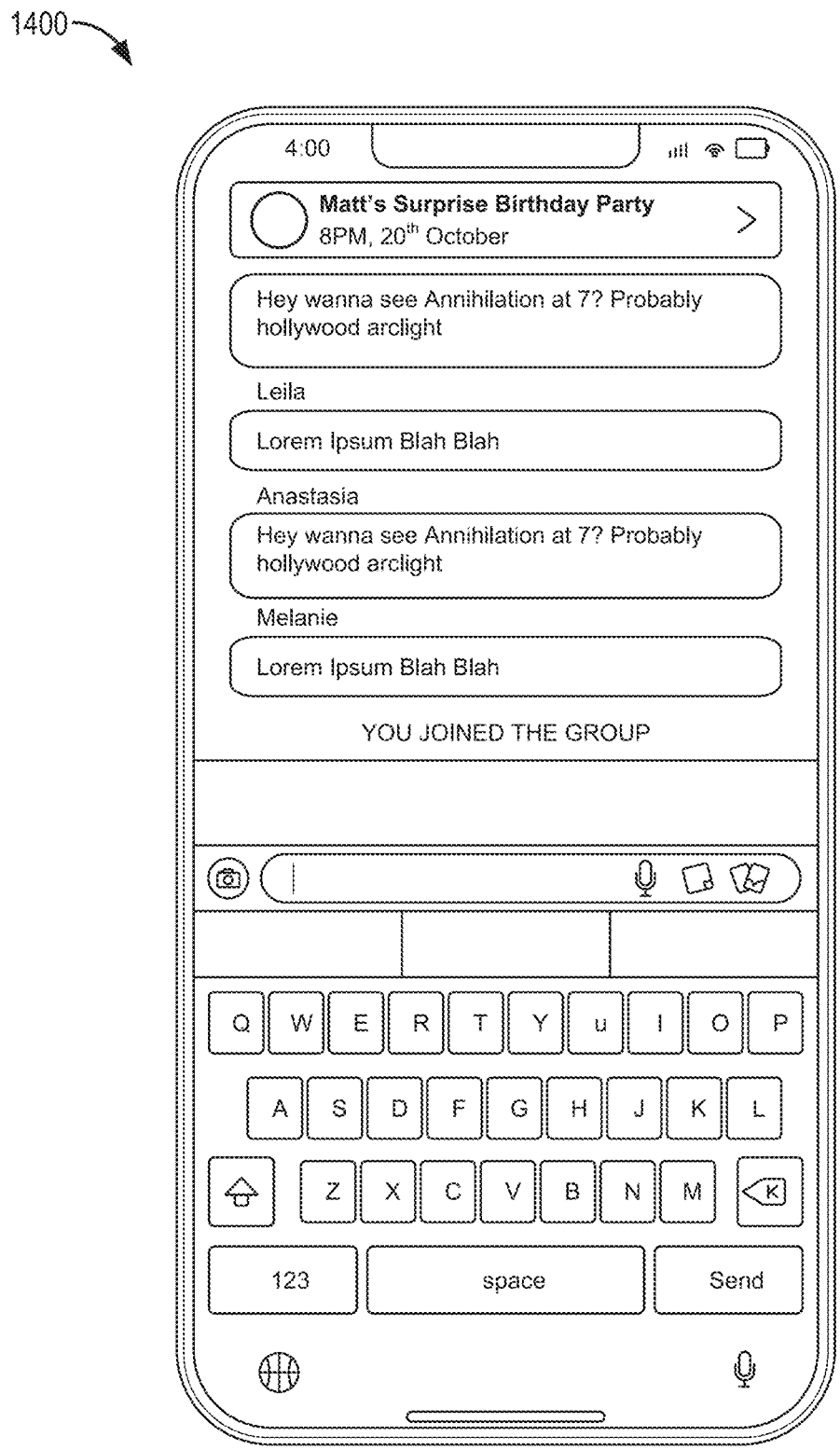

Once the computing system adds the user to the event, the computing system sends a response message to the computing device indicating that the user has successfully joined the event. The computing device can display an indication to the user that they have successfully joined the event. In one example, the computing device displays a message indicating that the user has joined in a chat interface to allow the user to chat with other users that have joined the event. FIG. 13 is an example GUI 1300 that includes a message 1302 indicating that the user has successfully joined the event 1310 and allows the user to send a message to the other users that have joined the event, such as by typing in a message in a dialog box 1304 via the keyboard 1306 or other means. The message the user and other users send will appear in the display section 1308, as shown in the example GUI 1400 of FIG. 14.

In one example embodiment, the computing device causes display of the chat session between users that have joined the event, wherein a user joining an event can only view messages in the chat session that occurred after the user joined the event. Any messages in the chat session before the user joined are visible to other users who have already joined, but not to the new user that has just joined. Any messages in the chat session that occur after the new user has joined, will be visible by the new user. In another example embodiment, when the user joins the event, the user can view all messages that that occurred before joining.

Figure 15:
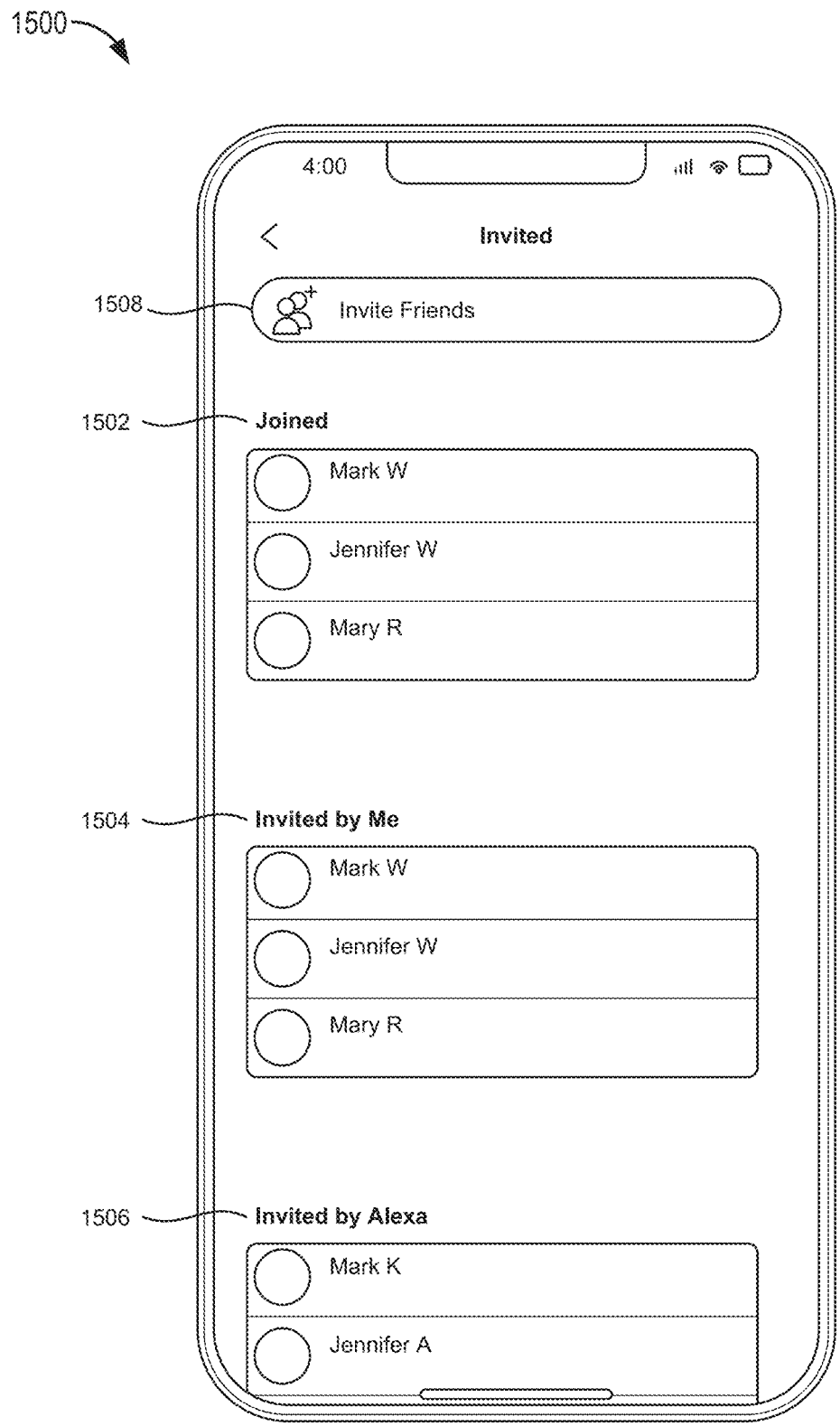
Figure 16:
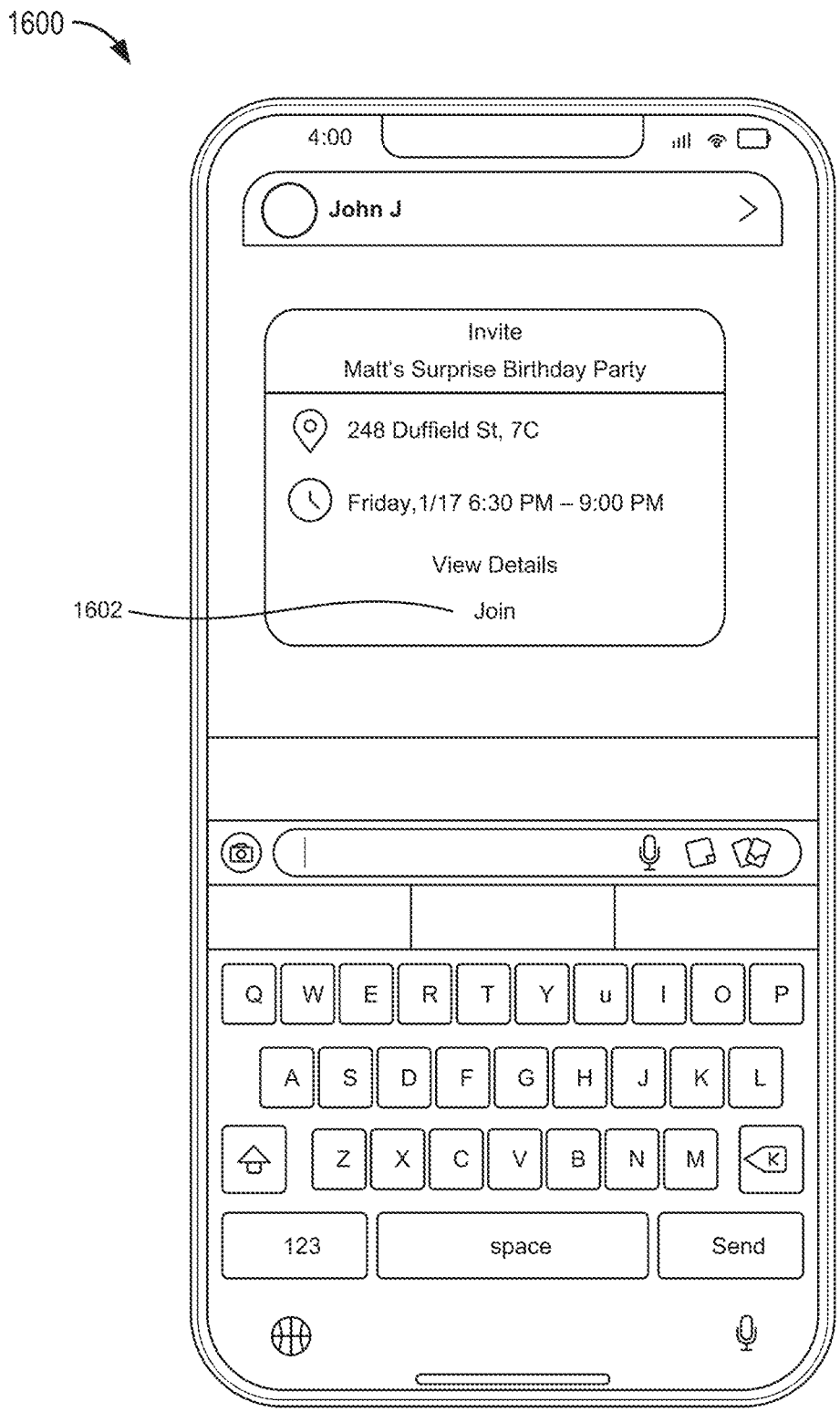

In one example embodiment, the computing device causes display of a GUI showing a list of users that have joined the event, a list of users that were invited but have not joined the event, and/or a list of users invited by a user other than the user that created the event that joined the event. FIG. 15 illustrates an example GUI 1500 that includes a list 1502 of users that have joined the event, a list 1504 of users that were invited by a first user (Me), and a list 1506 of users that were invited by a second user (Alexa). The GUI 1500 also include an option 1508 to invite additional users to the event. For example, if a user chooses to invite additional users, the invite comprising the media content item and custom event invite media overlay will be sent to the additional users. In another example, the invite comprising the custom event invite media overlay can be sent directly to each of the additional users via a chat session, as shown in the example GUI 1600 of FIG. 16. The user receiving the invite can join directly via the chat session (e.g., via join option 1602).

In one example embodiment, any user can invite any other users to the event. In another example embodiment, a user (e.g., a first user) can only invite another user to the event if the first user is a "friend" or a "best friend" of the user who created the event (the creator user). For instance, the first user must be of a certain status in the social network of the creator user in order for the first user to be able to send the invite to other users. The certain status can be set by the creator user or as a default by the computing system.

In one example embodiment, a user can share an invite that someone else created by adding the custom event invite media overlay to a media content item created by the user. For example, a user can take a photo or video and then add the custom invite media overlay and send the invite comprising the media content item and custom event invite media overlay to one or more other users. In another example, a user can share an invite by creating a new custom event invite media overlay that allows users to join the same event group as the original invite (e.g., the new custom event invite media overlay is linked to the original invite/event group).

Figure 17:
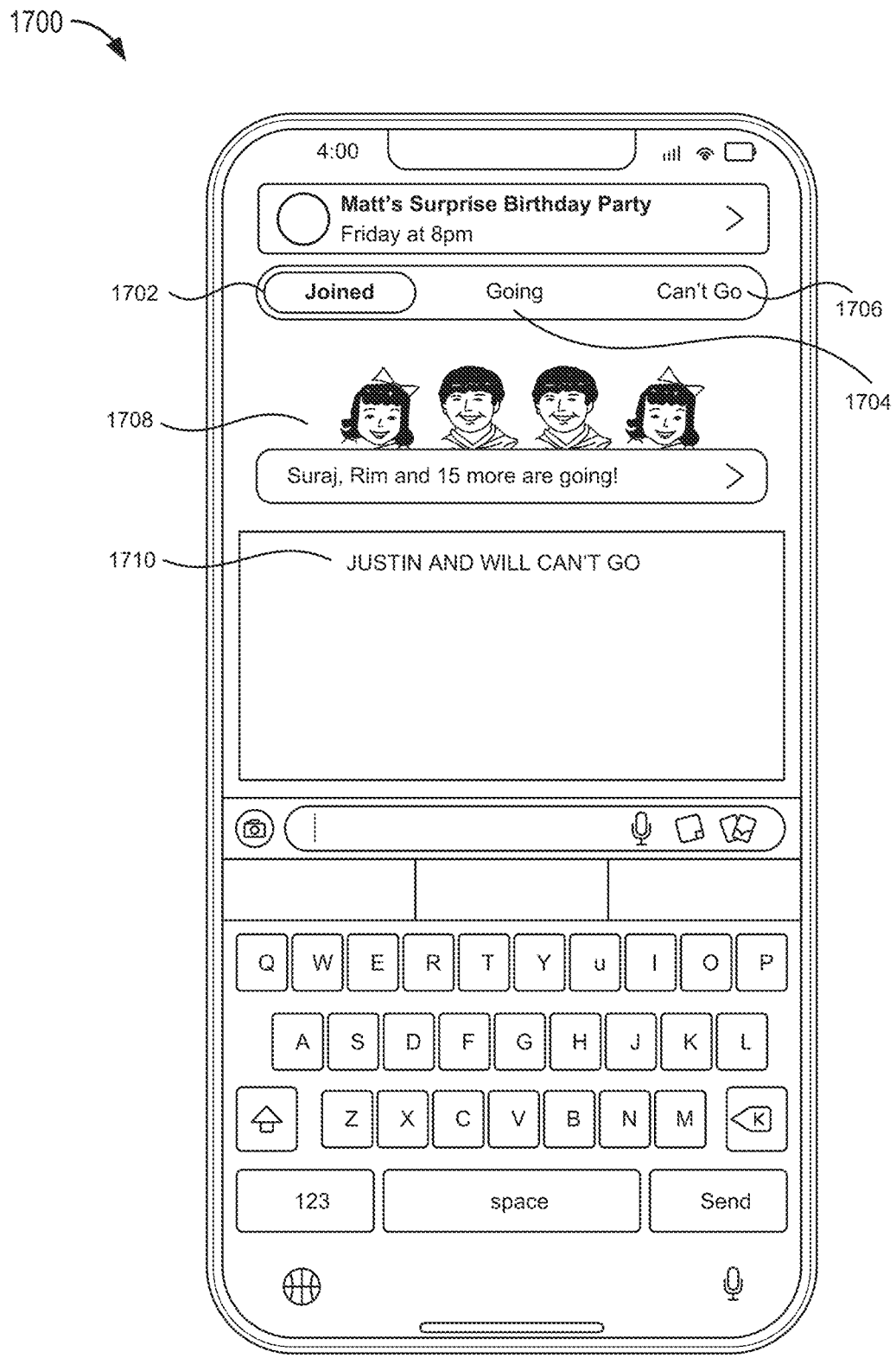

In one example embodiment, users can optionally RSVP when joining the event, or after joining the event. For example, the computing device can cause display of options for indicating whether the user will attend the event. FIG. 17 illustrates an example GUI 1700 including options to RSVP for the event. For example, the options include an option 1702 indicating that the user has joined the event, an option 1704 that can be selected to indicate that the user will attend the event, and an option 1706 indicating that the user will not attend the event. The GUI 1700 also includes messages indicating users that will be attending the event (1708) and users that will not be attending the event (1710). In one example, a user can still be part of the event group as long as the user has joined the event, regardless whether the user has indicated whether he can or cannot attend the event.

Figure 18:
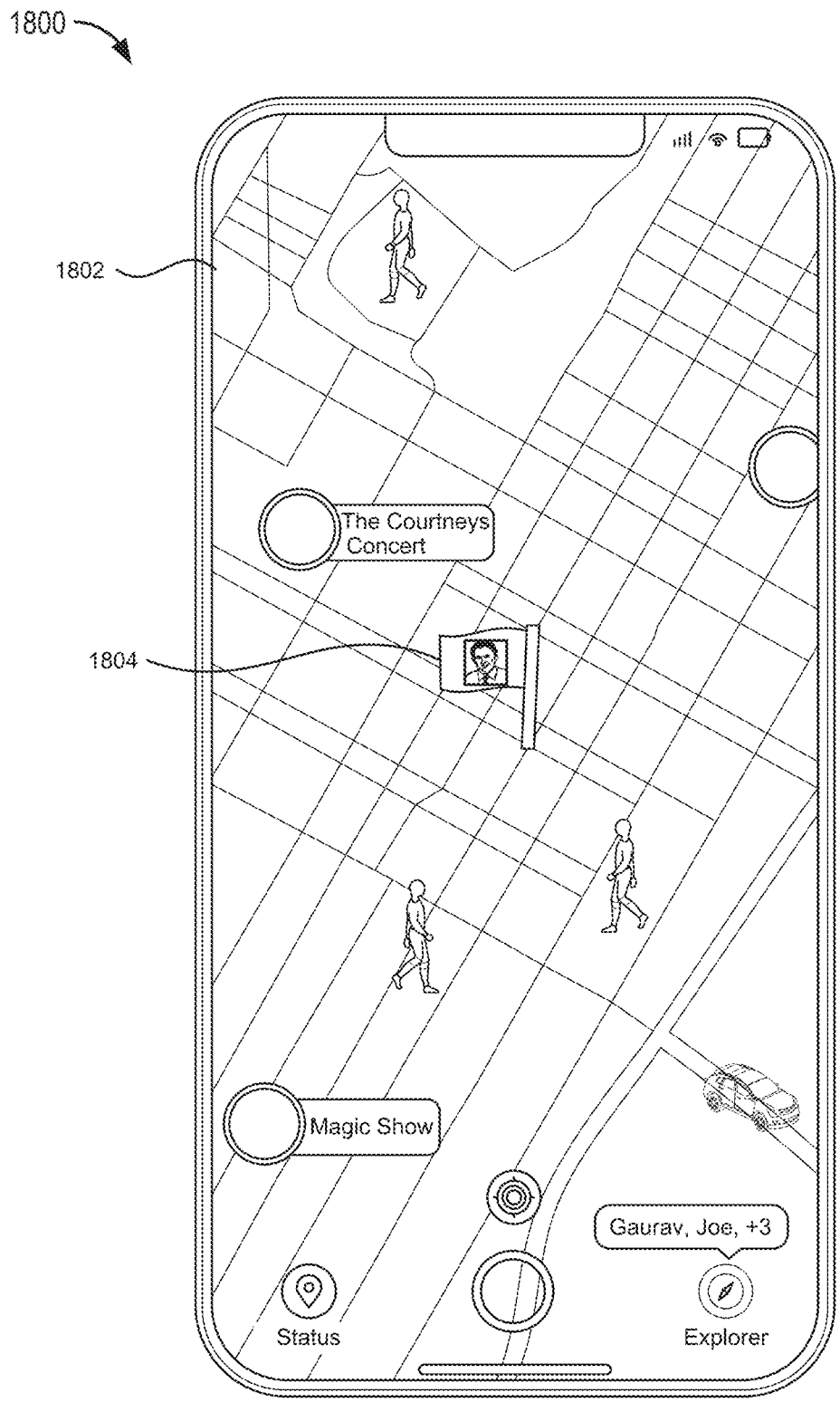

In one example embodiment, the computing device causes an indication of the event to display on a map in a GUI on the computing device. The indication of the event appears on the map at a location corresponding to the event and within a time period corresponding to the time of day of the event. FIG. 18 illustrates an example GUI 1800 displaying a map 1802 with an indication of the event in the form of a flag 1804. The flag 1804 is at a location in the map corresponding to the location of the event. In one example, the indication of the event appears on the map within a specified time window. For example, the flag 1804 may appear on the map a certain number of hours before a start time of the event (e.g., 12 hours before the event starts) and can continue to appear for a certain number of hours after an end time of the event (e.g., 6 hours after the event ends).

In one example embodiment, the visual indication of the event can reflect a number of people that have arrived at the event. For example, the flag or a blimp or balloon representing the event can expand (e.g., get bigger and bigger) the more people get to the event (and retract, e.g., get smaller and smaller as people leave the event).

Figure 19:
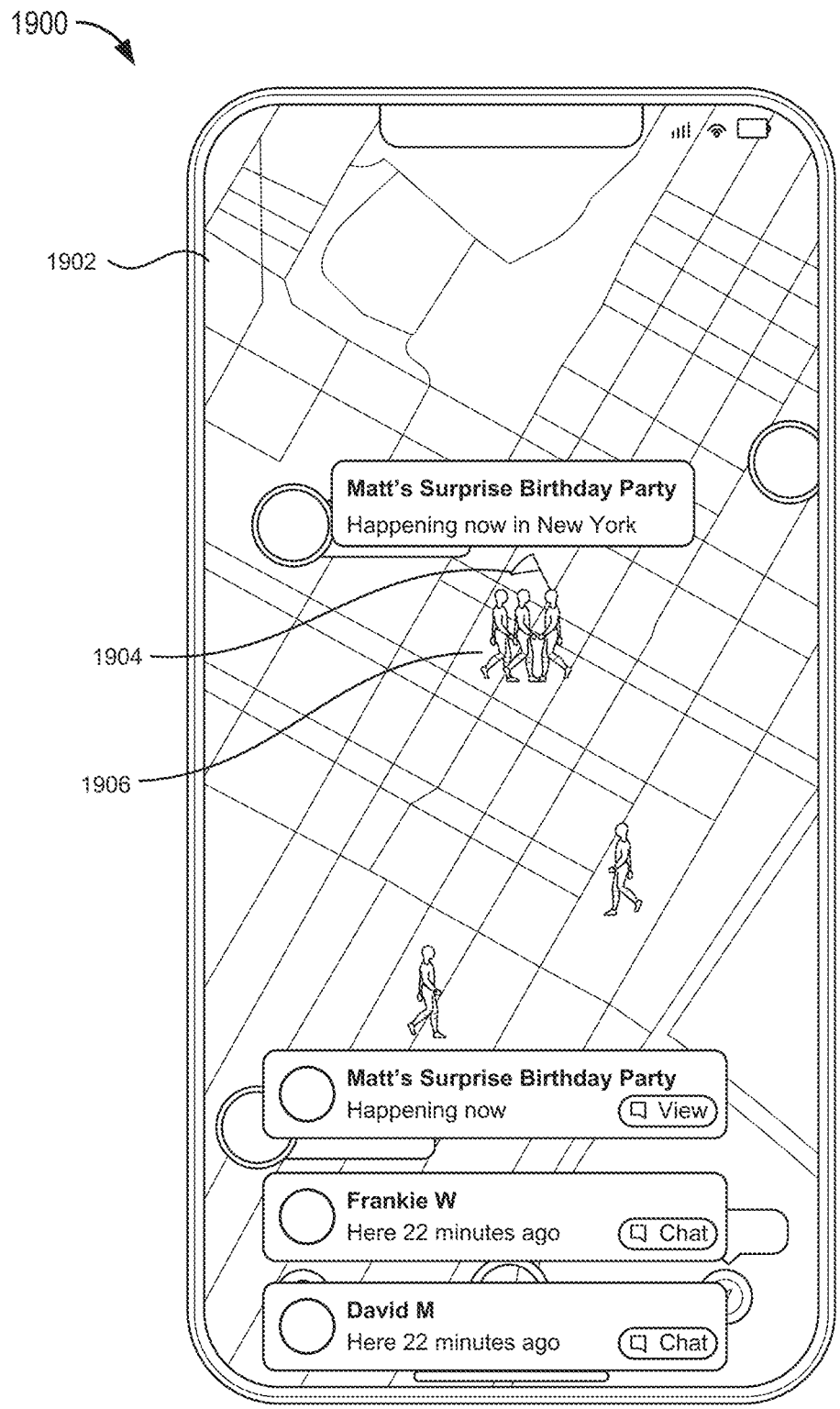

In one example embodiment, the computing device causes display of an avatar (or other indicium) corresponding to each user that is currently attending the event (e.g., at the location of the event). In one example, the avatar is a visual representation of the user (e.g., similar hair color or style, similar style, as the user). FIG. 19 illustrates an example GUI 1900 displaying a map 1902 with an indication of the event 1904 and an avatar 1906 for each user that is currently located at the event. For example, the computing system (e.g., server system 108) detects that a user is in a location within a predefined distance from the location of the event during a time period of the event (e.g., after the event starts, between when the event starts and when the event ends) and sends the information to the computing device to cause the avatar (or other indicia) for the user to be displayed on the map 1902 at the location of the event.

In one example embodiment, a user (e.g., the user that created the event) can cancel the event, but the event group can stay active. For example, when the event is cancelled, the computing device sends a request to cancel the event to a computing system. The computing system receives the request, stores an indication that the event is canceled, sends a notification to each user that joined the event that the event has been canceled, and changes the status and tile of the event to indicate that the event is canceled. The event group, however, can remain active so that the users that joined the event can continue to chat in a chat session.

In one example embodiment, users who are attending the event can capture media content items (e.g., images or video) and post them to the event group. For example, the computing device or computing system can determine that a user who has joined the event is capturing an image or video in a location of the event during the time of the event and automatically post the image or video to the event group in the form of a group story. The group story can be populated by media content items captured by the users that have joined the event when they are attending the event. In one example, the media content items posted to the event group are only viewable by those users that are part of the group.

For instance, a media content item can be captured on a computing device via a camera of the computing device. The computing device (or computing system) determines that the media content item is captured at a location (e.g., via GPS or similar technology of the computing device) and time of day corresponding to the event. The computing device (or computing system) can automatically post the media content item to a group story for the event group, based on determining that the media content item is captured at a location and time of day corresponding to the event.

In one example embodiment, instead of automatically posting media content items captured by users that have joined the event when they are attending the event, the computing device can include the group story in a destination list for sending the media content item. For example, after capturing the media content item, a user can select an option to send the media content item to a destination (e.g., one or more users and/or groups of users). The computing device can cause the event group to appear in the destination list.

Figure 20:
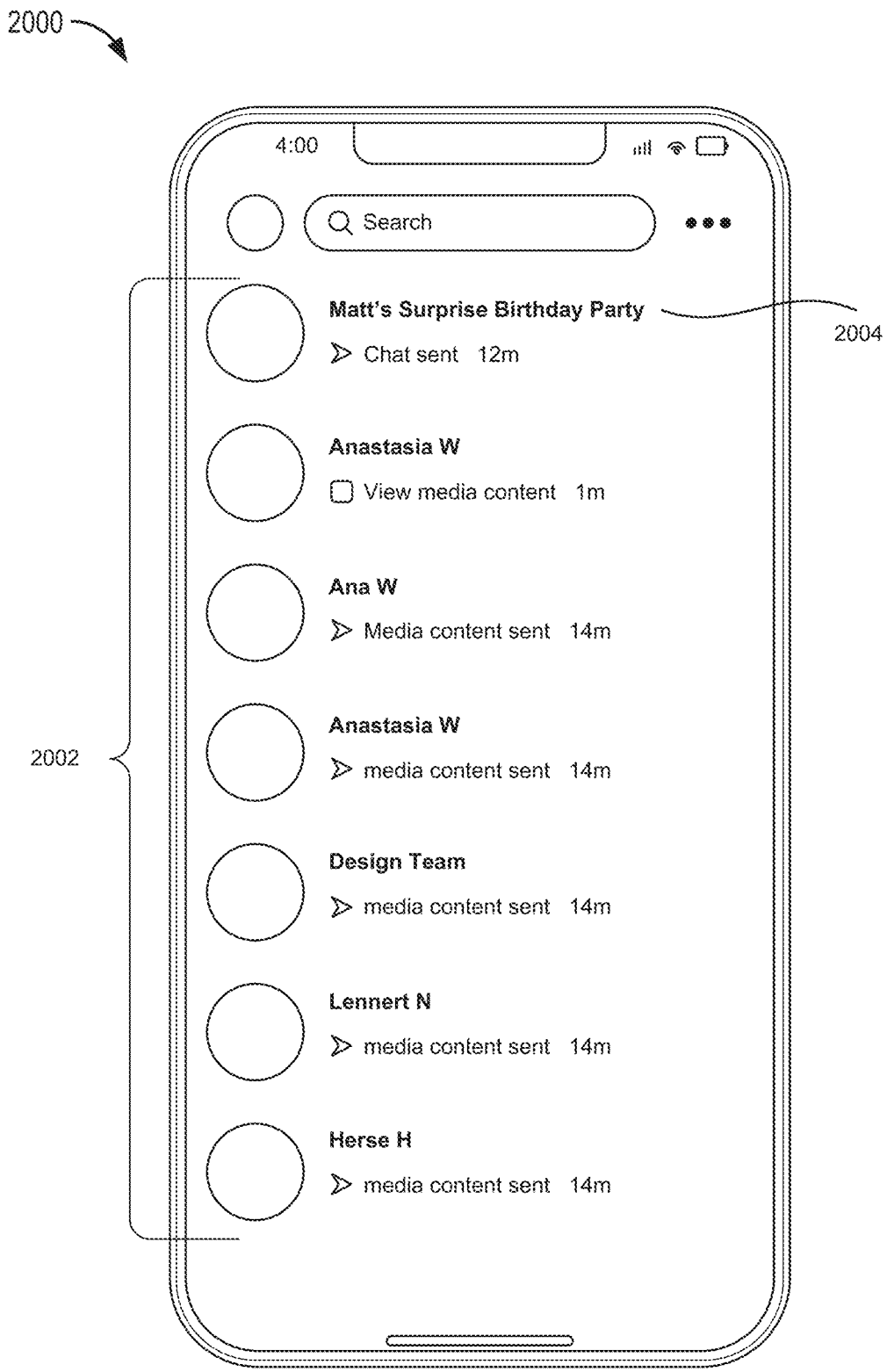

In one example embodiment, the destinations in the destination list are ranked in an order of relevance. In this case, the event group can be ranked higher in the list based on detecting that the user capturing the media content item has captured the media content item while attending the event (e.g., has captured the media content item while in the location of the event during the time of the event). FIG. 20 illustrates an example GUI 2000 displaying a destination list 2002 with the event group 2004 ranked first in the list. The user can select the event group 2004 to post the media content item to the group story for the event. The group story or media content item may be ephemeral (e.g., available for viewing for only a predetermined amount of time) or could be available indefinitely.

For instance, a media content item can be captured on a computing device via a camera of the computing device. The computing device (or computing system) determines that the media content item is captured at a location and time of day corresponding to the event. The computing device (or computing system) can rank options to which to send the media content item in a destination list wherein a media collection (group story) corresponding to the event is ranked higher in the destination list based on determining that the media content item is captured at a location and time of day corresponding to the event. The computing device (or computing system) causes display of the destination list with the ranked options on a display of the computing device.

Figure 21:
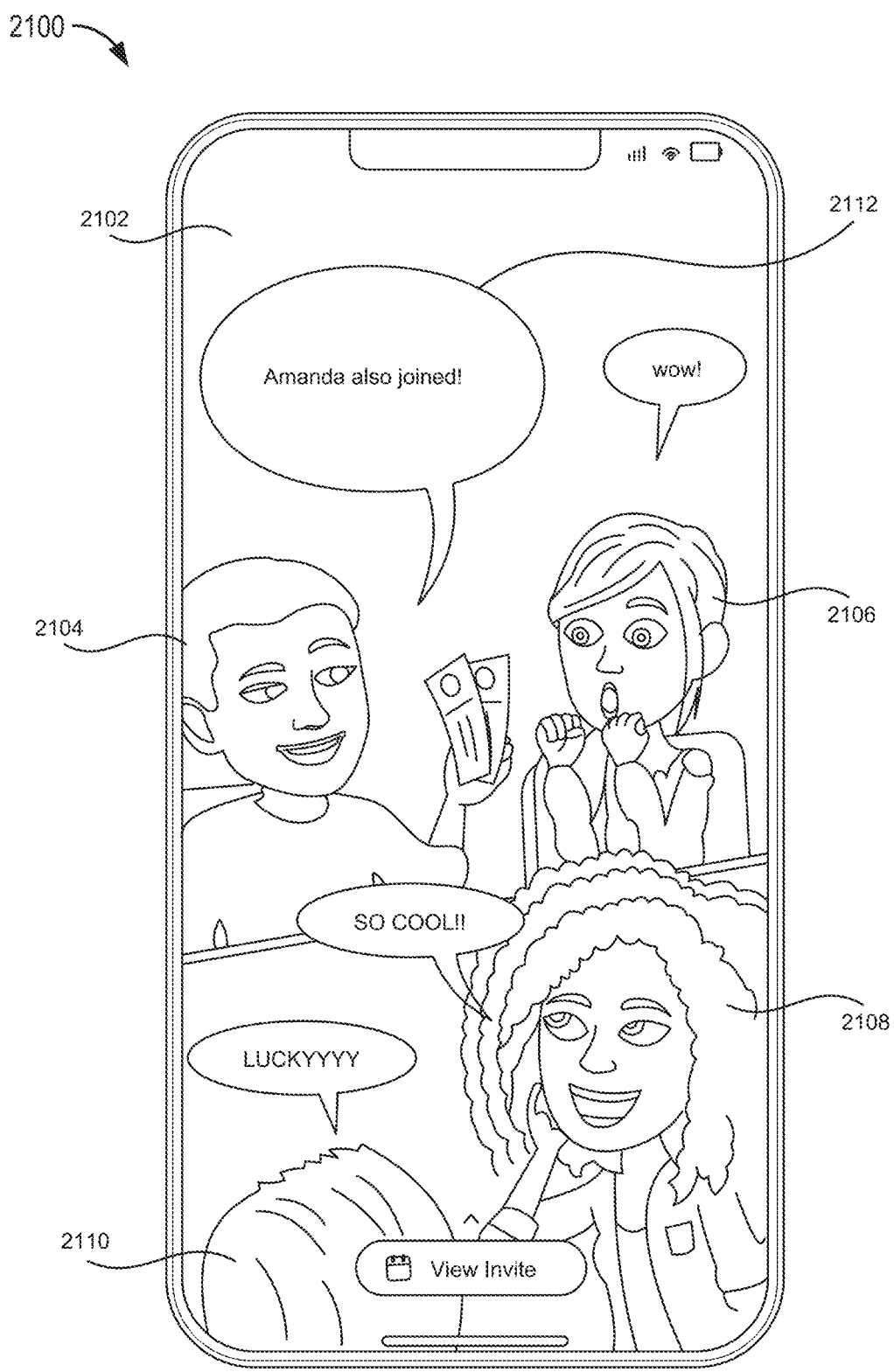

In one example, a graphic can be automatically generated and added to the group story when certain events occur corresponding to the event. For example, a graphic can be generated and added to the group story for the event group to indicate that a new user has joined the event. FIG. 21 illustrates an example graphic 2102 generated to reflect an event occurring for the event. In this example, avatars 2104, 2106, 2108, and 2110 representing some users that have joined are included in the graphic 2102, and a message 2112 that a new user has joined is included in the graphic 2102. The graphic 2102 is added to the media collection (group story for the event group).

In one example, the details of the event are integrated into a calendar on the computing device. The event details can be synced with the event integrated into the calendar to reflect any changes to the event (e.g., location change, date or time change, cancellation).

Figure 22:
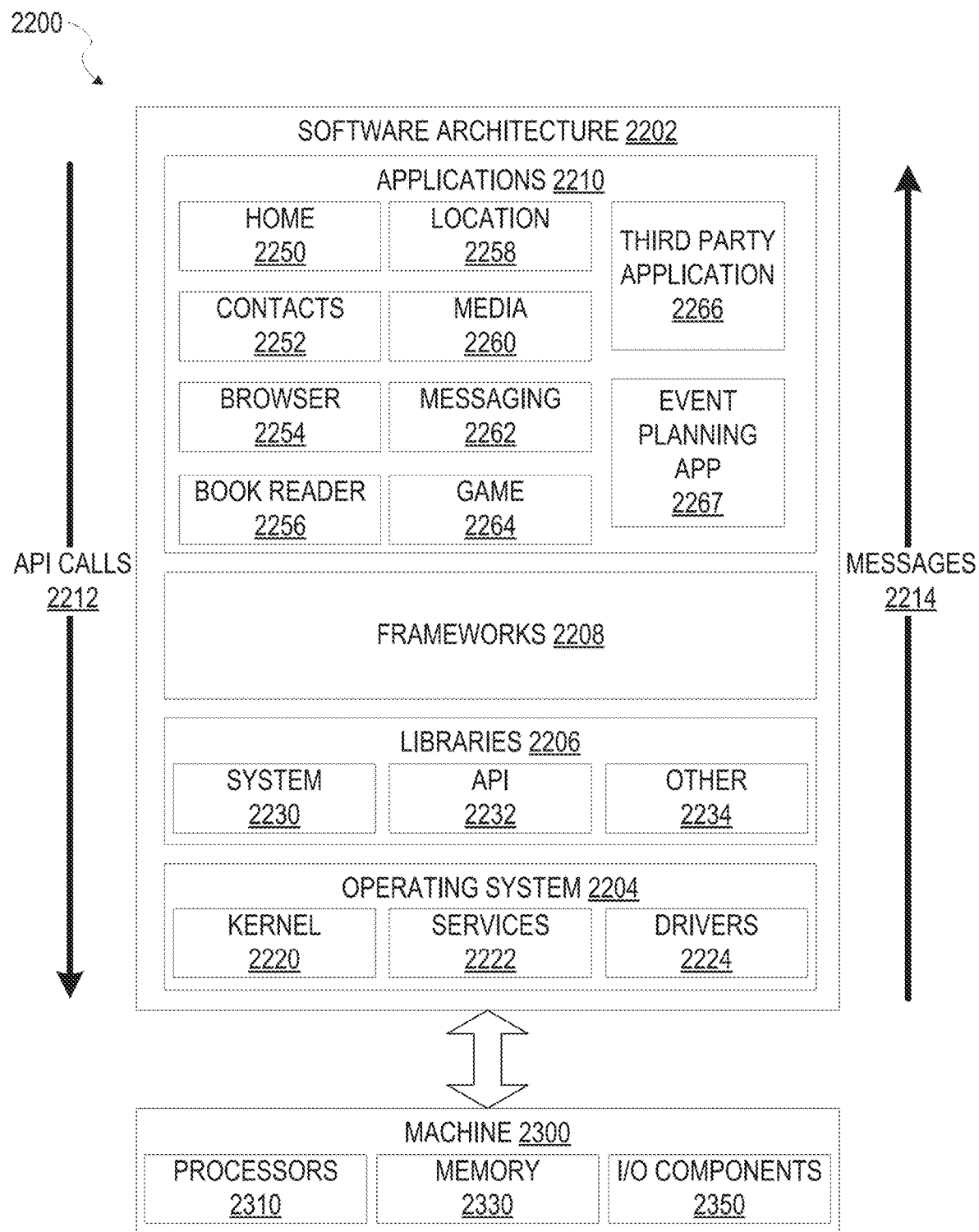
FIG. 22 is a block diagram illustrating an example of a software architecture that may be installed on a machine, according to some example embodiments.

FIG. 22 is a block diagram 2200 illustrating a software architecture 2202, which can be installed on any one or more of the devices described above. For example, in various embodiments, client devices 110 and servers and systems 102, 112, 116, 118, 122, and 124 may be implemented using some or all of the elements of the software architecture 2202. FIG. 22 is merely a non-limiting example of a software architecture, and it will be appreciated that many other architectures can be implemented to facilitate the functionality described herein. In various embodiments, the software architecture 2202 is implemented by hardware such as a machine 2300 of FIG. 23 that includes processors 2310, memory 2330, and input/output I/O components 2350. In this example, the software architecture 2202 can be conceptualized as a stack of layers where each layer may provide a particular functionality. For example, the software architecture 2202 includes layers such as an operating system 2204, libraries 2206, frameworks 2208, and applications 2210. Operationally, the applications 2210 invoke API calls 2212 through the software stack and receive messages 2214 in response to the API calls 2212, consistent with some embodiments.

In various implementations, the operating system 2204 manages hardware resources and provides common services. The operating system 2204 includes, for example, a kernel 2220, services 2222, and drivers 2224. The kernel 2220 acts as an abstraction layer between the hardware and the other software layers, consistent with some embodiments. For example, the kernel 2220 provides memory management, processor management (e.g., scheduling), component management, networking, and security settings, among other functionality. The services 2222 can provide other common services for the other software layers. The drivers 2224 are responsible for controlling or interfacing with the underlying hardware, according to some embodiments. For instance, the drivers 2224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2206 provide a low-level common infrastructure utilized by the applications 2210. The libraries 2206 can include system libraries 2230 (e.g., C standard library) that can provide functions such as memory allocation functions, string manipulation functions, mathematic functions, and the like. In addition, the libraries 2206 can include API libraries 2232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 2206 can also include a wide variety of other libraries 2234 to provide many other APIs to the applications 2210.

The frameworks 2208 provide a high-level common infrastructure that can be utilized by the applications 2210, according to some embodiments. For example, the frameworks 2208 provide various graphic user interface (GUI) functions, high-level resource management, high-level location services, and so forth. The frameworks 2208 can provide a broad spectrum of other APIs that can be utilized by the applications 2210, some of which may be specific to a particular operating system 2204 or platform.

In an example embodiment, the applications 2210 include a home application 2250, a contacts application 2252, a browser application 2254, a book reader application 2256, a location application 2258, a media application 2260, a messaging application 2262, a game application 2264, and a broad assortment of other applications such as a third-party application 2266. According to some embodiments, the applications 2210 are programs that execute functions defined in the programs. Various programming languages can be employed to create one or more of the applications 2210, structured in a variety of manners, such as object-oriented programming languages (e.g., Objective-C, Java, or C++) or procedural programming languages (e.g., C or assembly language). In a specific example, the third-party application 2266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2266 can invoke the API calls 2212 provided by the operating system 2204 to facilitate functionality described herein.

Some embodiments may particularly include an event planning application 2267. In certain embodiments, this may be a standalone application that operates to manage communications with a server system, such as third-party servers or the server system 108. In other embodiments, this functionality may be integrated with another application (e.g., the messaging application 2262). The event planning application 2267 may request and display various data related to messaging, media content, media collections, media overlays, interactive messages, chat messages, and so forth, and may provide the capability for a user to input data related to the system via a touch interface, via a keyboard, or using a camera device of the machine 2300, communication with a server system via the I/O components 2350, and receipt and storage of object data in the memory 2330. Presentation of information and user inputs associated with the information may be managed by the event planning application 2267 using different frameworks 2208, library 2206 elements, or operating system 2204 elements operating on the machine 2300.

Figure 23:
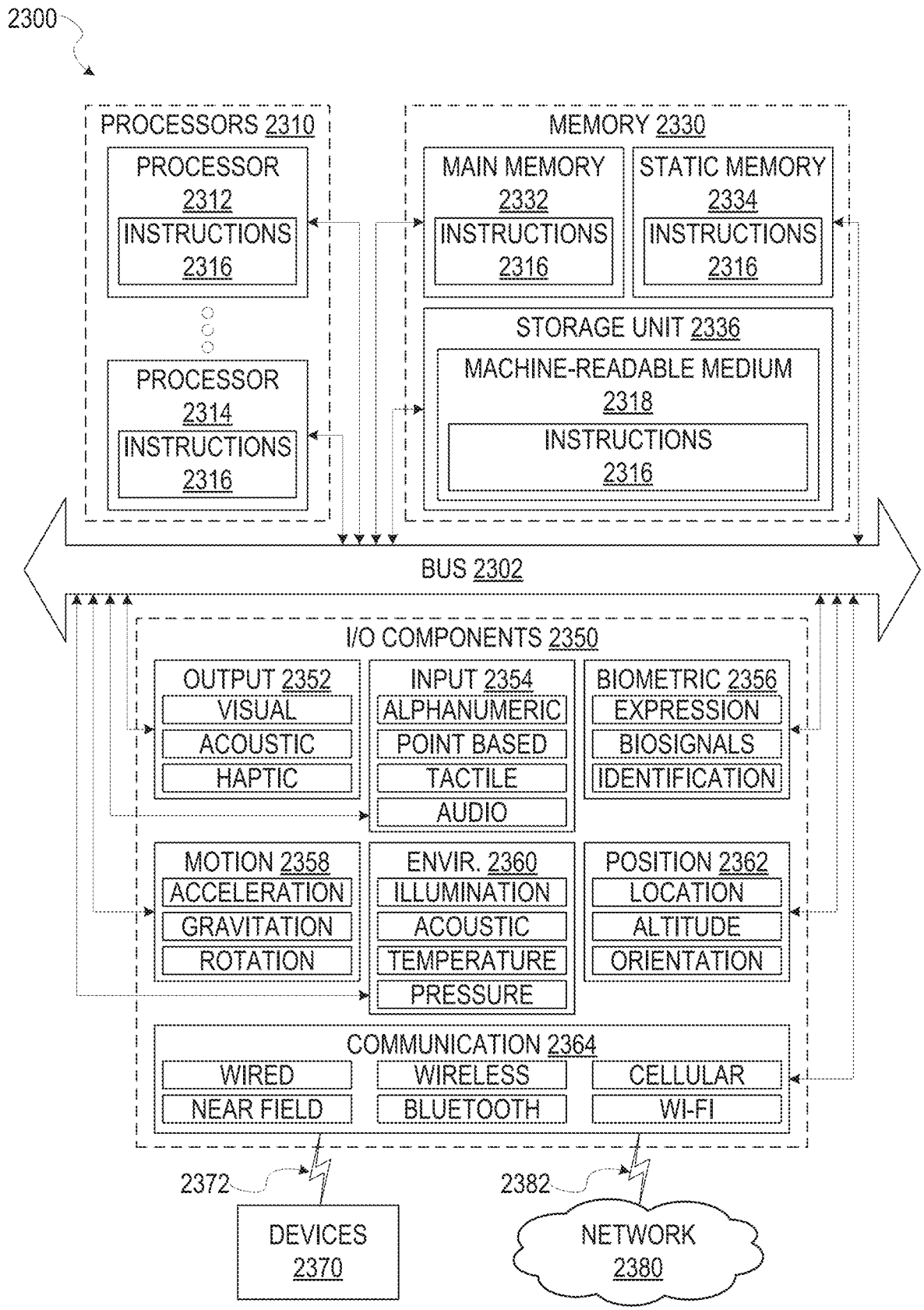
FIG. 23 illustrates a diagrammatic representation of a machine, in the form of a computer system, within which a set of instructions may be executed for causing the machine to perform any one or more of the methodologies discussed herein, according to an example embodiment.

FIG. 23 is a block diagram illustrating components of a machine 2300, according to some embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein can be executed. In alternative embodiments, the machine 2300 operates as a standalone device or can be coupled (e.g., networked) to other machines. In a networked deployment, the machine 2300 may operate in the capacity of a server system 102, 112, 116, 118, 122, 124, and the like, or a client device 110 in a server-client network environment, or as a peer machine in a peer-to-peer (or distributed) network environment. The machine 2300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2316, sequentially or otherwise, that specify actions to be taken by the machine 2300. Further, while only a single machine 2300 is illustrated, the term "machine" shall also be taken to include a collection of machines 2300 that individually or jointly execute the instructions 2316 to perform any one or more of the methodologies discussed herein.

In various embodiments, the machine 2300 comprises processors 2310, memory 2330, and I/O components 2350, which can be configured to communicate with each other via a bus 2302. In an example embodiment, the processors 2310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 2312 and a processor 2314 that may execute the instructions 2316. The term "processor" is intended to include multi-core processors 2310 that may comprise two or more independent processors 2312, 2314 (also referred to as "cores") that can execute instructions 2316 contemporaneously. Although FIG. 23 shows multiple processors 2310, the machine 2300 may include a single processor 2310 with a single core, a single processor 2310 with multiple cores (e.g., a multi-core processor 2310), multiple processors 2312, 2314 with a single core, multiple processors 2312, 2314 with multiple cores, or any combination thereof.

The memory 2330 comprises a main memory 2332, a static memory 2334, and a storage unit 2336 accessible to the processors 2310 via the bus 2302, according to some embodiments. The storage unit 2336 can include a machine-readable medium 2318 on which are stored the instructions 2316 embodying any one or more of the methodologies or functions described herein. The instructions 2316 can also reside, completely or at least partially, within the main memory 2332, within the static memory 2334, within at least one of the processors 2310 (e.g., within the processor's cache memory), or any suitable combination thereof, during execution thereof by the machine 2300. Accordingly, in various embodiments, the main memory 2332, the static memory 2334, and the processors 2310 are considered machine-readable media 2318.

As used herein, the term "memory" refers to a machine-readable medium 2318 able to store data temporarily or permanently and may be taken to include, but not be limited to, random-access memory (RAM), read-only memory (ROM), buffer memory, flash memory, and cache memory. While the machine-readable medium 2318 is shown, in an example embodiment, to be a single medium, the term "machine-readable medium" should be taken to include a single medium or multiple media (e.g., a centralized or distributed database, or associated caches and servers) able to store the instructions 2316. The term "machine-readable medium" shall also be taken to include any medium, or combination of multiple media, that is capable of storing instructions (e.g., instructions 2316) for execution by a machine (e.g., machine 2300), such that the instructions 2316, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2350 include a wide variety of components to receive input, provide output, produce output, transmit information, exchange information, capture measurements, and so on. In general, it will be appreciated that the I/O components 2350 can include many other components that are not shown in FIG. 23. The I/O components 2350 are grouped according to functionality merely for simplifying the following discussion, and the grouping is in no way limiting. In various example embodiments, the I/O components 2350 include output components 2352 and input components 2354. The output components 2352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2350 include biometric components 2356, motion components 2358, environmental components 2360, or position components 2362, among a wide array of other components. For example, the biometric components 2356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 include acceleration sensor components (e.g., accelerometer), gravitation sensor components, rotation sensor components (e.g., gyroscope), and so forth. The environmental components 2360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2350 may include communication components 2364 operable to couple the machine 2300 to a network 2380 or devices 2370 via a coupling 2382 and a coupling 2372, respectively. For example, the communication components 2364 include a network interface component or another suitable device to interface with the network 2380. In further examples, communication components 2364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2370 may be another machine 2300 or any of a wide variety of peripheral devices (e.g., a peripheral device coupled via a Universal Serial Bus (USB)).

Moreover, in some embodiments, the communication components 2364 detect identifiers or include components operable to detect identifiers. For example, the communication components 2364 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2364, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 2380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2380 or a portion of the network 2380 may include a wireless or cellular network, and the coupling 2382 may be a Code Division Multiple Access (CDMA) connection, a Global System for Mobile communications (GSM) connection, or another type of cellular or wireless coupling. In this example, the coupling 2382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2316 are transmitted or received over the network 2380 using a transmission medium via a network interface device (e.g., a network interface component included in the communication components 2364) and utilizing any one of a number of well-known transfer protocols (e.g., Hypertext Transfer Protocol (HTTP)). Similarly, in other example embodiments, the instructions 2316 are transmitted or received using a transmission medium via the coupling 2372 (e.g., a peer-to-peer coupling) to the devices 2370. The term "transmission medium" shall be taken to include any intangible medium that is capable of storing, encoding, or carrying the instructions 2316 for execution by the machine 2300, and includes digital or analog communications signals or other intangible media to facilitate communication of such software.

Furthermore, the machine-readable medium 2318 is non-transitory (in other words, not having any transitory signals) in that it does not embody a propagating signal. However, labeling the machine-readable medium 2318 "non-transitory" should not be construed to mean that the medium is incapable of movement; the machine-readable medium 2318 should be considered as being transportable from one physical location to another. Additionally, since the machine-readable medium 2318 is tangible, the machine-readable medium 2318 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing, by a first computing device, a media content item via a camera device of the first computing device;
   displaying, on a user interface of the first computing device, the captured media content item and a menu overlaid on the captured media content item, the menu comprising an interface element to add an event media overlay to the captured media content item;
   receiving, by the first computing device, a selection of the interface element to add the event media overlay to the captured media content item;
   receiving, by the first computing device, content to be added to the event media overlay, the content corresponding to an event initiated by a user of the first computing device;
   adding to the event media overlay, by the first computing device, the content corresponding to the event to generate a custom event media overlay;
   automatically resizing the custom event media overlay from an original size to a resized custom event media overlay based on the content added to the event media overlay;
   displaying the resized custom event media overlay overlaid on the captured media content item;
   displaying a destination list comprising contacts for selection to send the resized custom event media overlay overlaid on the captured media content item;
   receiving, by the first computing device, a selection of at least one contact; and
   sending, to a second computing device associated the at least one contact, the resized custom event media overlay overlaid on the captured media content item.

2. The method of claim 1, further comprising:
   adding the resized custom event media overlay overlaid on the captured media content item to a media collection associated with the event.

3. The method of claim 1, wherein the event media overlay is in a form of a sticker.

4. The method of claim 1, wherein the media content item comprises an image or video.

5. The method of claim 1, wherein content corresponding to the event comprises at least one of a title, a location, a date, or a time of day.

6. The method of claim 1, further comprising:
   receiving a notification indicating that the at least one contact joined the event after receiving the media content item comprising the resized custom event media overlay.

7. The method of claim 1, wherein the first computing device is associated with a first user and the method further comprises:
   displaying a list of users that have joined the event, a list of users that were invited but have not joined the event, and a list of users invited by a second user that has joined the event.

8. The method of claim 1, further comprising:
   displaying an indication of the event on a map in the user interface on the first computing device, the indication of the event appearing on the map at a location corresponding to the event and within a specified time period corresponding to a time of the event.

9. The method of claim 8, further comprising:
   displaying an avatar corresponding to each user that is currently attending the event, with the indication of the event on the map.

10. The method of claim 1, further comprising:
displaying an indication of the event on a map in the user interface of the first computing device, the indication including a number of users that have arrived at the event.

11. The method of claim 1, further comprising:
displaying a chat session between users that have joined the event, wherein a user joining an event can only view messages in the chat session that occurred after the user joined the event.

12. The method of claim 1, further comprising:
capturing a second media content item via the camera device of the first computing device;
determining that the second media content item is captured at a location and time corresponding to the event;
ranking options to which to send the second media content item in a destination list wherein a media collection corresponding to the event is ranked higher in the destination list based on determining that the second media content item is captured at the location and time corresponding to the event; and
displaying the destination list with the ranked options.

13. The method of claim 1, further comprising:
receiving notification that the at least one contact sent the media content item to the event comprising the custom event media overlay to a third computing device associated with a third user; and
displaying the notification on a display of the first computing device.

14. The method of claim 1, further comprising:
generating a token comprising a unique identifier for the event; and
sending the token to a server system wherein the token is correlated with the content corresponding to the event.

15. The method of claim 1, further comprising:
displaying a message in a chat session between users that have joined the event, the message indicating that a new user has joined the event and adding the new user to the chat session.

16. The method of claim 1, wherein a media collection is associated with the event and further comprising:
in response to determining that a new user has joined the event, automatically generating a graphic comprising an avatar of the new user and a message indicating that the new user has joined the event; and
adding the generated graphic to the media collection.

17. A computing device comprising:
a memory that stores instructions; and
one or more processors configured by the instructions to perform operations comprising:
capturing a media content item via a camera device of the computing device;
displaying, on a user interface of the computing device, the captured media content item and a menu overlaid on the captured media content item, the menu comprising an interface element to add an event media overlay to the captured media content item;
receiving a selection of the interface element to add the event media overlay to the captured media content item;
receiving content to be added to the event media overlay, the content corresponding to an event initiated by a user of the computing device;
adding to the event media overlay the content corresponding to the event to generate a custom event media overlay;
automatically resizing the custom event media overlay from an original size to a resized custom event media overlay based on the content added to the event media overlay;
displaying the resized custom event media overlay overlaid on the captured media content item;
displaying a destination list comprising contacts for selection to send the resized custom event media overlay overlaid on the captured media content item;
receiving a selection of at least one contact; and
sending, to a second computing device associated the at least one contact, the resized custom event media overlay overlaid on the captured media content item.

18. The method of claim 1, further comprising:
adding the resized custom event media overlay overlaid on the captured media content item to a media collection associated with the event.

19. The method of claim 1, wherein the event media overlay is in a form of a sticker.

20. A non-transitory computer-readable medium comprising instructions stored thereon that are executable by at least one processor to cause a computing device to perform operations comprising:
capturing a media content item via a camera device of the computing device;
displaying, on a user interface of the computing device, the captured media content item and a menu overlaid on the captured media content item, the menu comprising an interface element to add an event media overlay to the captured media content item;
receiving a selection of the interface element to add the event media overlay to the captured media content item;
receiving content to be added to the event media overlay, the content corresponding to an event initiated by a user of the computing device;
adding to the event media overlay the content corresponding to the event to generate a custom event media overlay;
automatically resizing the custom event media overlay from an original size to a resized custom event media overlay based on the content added to the event media overlay;
displaying the resized custom event media overlay overlaid on the captured media content item;
displaying a destination list comprising contacts for selection to send the resized custom event media overlay overlaid on the captured media content item;
receiving a selection of at least one contact; and
sending, to a second computing device associated the at least one contact, the resized custom event media overlay overlaid on the captured media content item.

* * * * *